US011568715B2

(12) United States Patent
Mitchell

(10) Patent No.: US 11,568,715 B2
(45) Date of Patent: Jan. 31, 2023

(54) GAMING SYSTEM, GAMING DEVICE, AND METHOD FOR PROVIDING A SPORTS-BASED CARD GAME

(71) Applicant: UBER BOSS, INC., Austin, TX (US)

(72) Inventor: Paul Mitchell, Austin, TX (US)

(73) Assignee: UBER BOSS, INC., Austin, TX (US)

( * ) Notice: Subject to any disclaimer, the term of this patent is extended or adjusted under 35 U.S.C. 154(b) by 0 days.

(21) Appl. No.: 16/900,173

(22) Filed: Jun. 12, 2020

(65) Prior Publication Data

US 2020/0312098 A1 Oct. 1, 2020

Related U.S. Application Data

(63) Continuation-in-part of application No. PCT/US2018/065621, filed on Dec. 14, 2018.

(60) Provisional application No. 62/663,399, filed on Apr. 27, 2018, provisional application No. 62/663,379, filed on Apr. 27, 2018, provisional application No. 62/598,516, filed on Dec. 14, 2017.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3293* (2013.01); *G07F 17/3211* (2013.01); *G07F 17/3223* (2013.01); *G07F 17/3262* (2013.01); *G07F 17/3267* (2013.01); *G07F 17/3288* (2013.01)

(58) Field of Classification Search
CPC .............................. G07F 17/32; G07F 17/3211
USPC .............................. 463/1, 10, 11, 20, 22, 39
See application file for complete search history.

(56) References Cited

U.S. PATENT DOCUMENTS

| | | | | |
|---|---|---|---|---|
| 8,747,210 | B2 * | 6/2014 | Kennedy | G07F 17/3211 463/17 |
| 2007/0015562 | A1 * | 1/2007 | Smith | G07F 17/32 463/13 |
| 2013/0225271 | A1 * | 8/2013 | Amaitis | G07F 17/323 463/25 |
| 2017/0098348 | A1 * | 4/2017 | Odom | G07F 17/3288 |
| 2017/0124812 | A1 * | 5/2017 | Washington | G07F 17/3248 |

* cited by examiner

*Primary Examiner* — Adetokunbo O Torimiro
(74) *Attorney, Agent, or Firm* — Hunton Andrews Kurth LLP

(57) ABSTRACT

A gaming system, gaming device, and method using a deck of cards containing statistics and identifying information from real-world sports players is described. The cards in the deck may contain the player scores for a set of games or matches as well as other player-related information. The gaming system and device randomly generate a hand and randomly select one of the player's pre-determined scores for each of the cards. The user's score may be determined through a variety of methods utilizing the player scores on the cards in the user's hand. The outcome of the user's hand may be determined by matching the user's score with a pay table, or for a multi-user game, the outcome may be determined by finding the highest scorer among the participating users.

18 Claims, 33 Drawing Sheets

FIG. 6

74 Drew Brees 2013 76

78 80 82 72

| | | |
|---|---|---|
| 1 | week: 1 | points: 24 |
| 2 | week: 3 | points: 37 |
| 3 | week: 4 | points: 40 |
| 4 | week: 5 | points: 23 |
| 5 | week: 6 | points: 20 |
| 6 | week: 8 | points: 43 |
| 7 | week: 9 | points: 23 |
| 8 | week: 10 | points: 39 |
| 9 | week: 12 | points: 23 |
| 10 | week: 14 | points: 36 |
| 11 | week: 15 | points: 21 |
| 12* | week: 17 | points: 45 |

84

FIG. 8B

ID:QB2013011 830

832 834

| num | points |
|---|---|
| 1 | 24 |
| 2 | 37 |
| 3 | 40 |
| 4 | 23 |
| 5 | 20 |
| 6 | 43 |
| 7 | 23 |
| 8 | 39 |
| 9 | 23 |
| 10 | 36 |
| 11 | 21 |
| 12 | 45 |

GAMING SYSTEM, GAMING DEVICE, AND METHOD FOR PROVIDING A SPORTS-BASED CARD GAME

CROSS REFERENCE TO RELATED APPLICATIONS

This application claims the benefit of U.S. Provisional Application Ser. No. 62/598,516 filed Dec. 14, 2017; Applicant incorporates by reference herein Application Ser. No. 62/598,516 in its entirety. This application claims the benefit of U.S. Provisional Application Ser. No. 62/663,379 filed Apr. 27, 2018; Applicant incorporates by reference herein Application Ser. No. 62/663,379 in its entirety. This application claims the benefit of U.S. Provisional Application Ser. No. 62/663,399 filed Apr. 27, 2018; Applicant incorporates by reference herein Application Ser. No. 62/663,399 in its entirety. This application is related to Ser. No. 16/220,554 issued as U.S. Pat. No. 10,482,720. This application further claims priority from PCT/US2018/065621 filed Dec. 14, 2018.

FIELD OF INVENTION

The present invention is directed to a method of using a deck of cards containing statistics and identifying information from real-world sports players.

BACKGROUND AND SUMMARY

The present disclosure relates generally to gaming machines and to methods for playing wagering games, and more particularly, to a gaming machine and a gaming system using fantasy sports as the basis for scoring in its games.

Gaming machines, such as slot machines and video poker machines, have been an important segment of the gaming industry for many years. Given that slot machines and video poker machines are well known by the gaming consumers, manufacturers and operators of these machines have attempted to make constant enhancements to attract and retain players. These enhancements typically involve slight changes to the wagering, probabilities or bonuses that might help make a game stand out among competitors. However, particularly in the case of video poker machines, but with slot machines as well, there is a limit to how much an operator or manufacturer can change the game to make it distinctive. In the case of video poker, the operator or manufacturer is limited by the standard poker deck of 52 cards, perhaps augmented by a joker or a wild card of some sort.

In addition, in recent years electronic gaming tables have become a growing segment in the casino industry. And with this newer technology comes the need to create multi-user entertainment options that will attract new users.

Fantasy sports games have become increasingly popular over the last few years. These games comprise contests that allow participants to select one or more real-life players to form a "fantasy" team. The statistics generated by those real-life players in real sporting events translates to points scored for the fantasy sports participant's team in the game. According to the Fantasy Sports Trade Association, nearly 60 million people in the US and Canada participated in some form of fantasy sports game in 2017. More recently Daily Fantasy Sports, a more accelerated version of fantasy sports games, wherein a user might hold a team for a week or even just one day, rather than over the course of a sports season, have become much more popular. Fantasy sports games and particularly the faster-paced version, Daily Fantasy Sports, involve wagering by the participants. Despite the popularity of these games and the creation of newer, faster-paced games, users are still dependent on the real-time results from the sporting events to which their particular fantasy team is drawn from. So users have to wait often a day or a week before they can play a new game. In addition, some games can't begin until a sufficient number of users have joined, so in some cases users might wait to play a game only to be denied because there was not a sufficient number of users for the game to proceed.

There is a need to provide people who are interested in fantasy sports games the ability to play the games when they would like to, without waiting for the sporting event to occur or other users to join a game pool. There is a need to offer users exciting new sports-related games with fast-paced action and interesting choices and payouts, and for users seeking group play, there is a need for multi-user fantasy sports games.

As for the manufacturers and operators, there is a continuing need to develop new games and improved gaming enhancements that attract frequent play through improved entertainment value to the player. For example, in the case of a casino, its profits rely upon consumers visiting the casino and gambling or otherwise spending money in the casino. It can increase its profits by encouraging consumers to remain in the casino using the gaming devices and by finding ways to encourage the consumer to return to the casino to use the gaming devices again.

Given the familiarity with and affinity for fantasy sports among game players, bringing those elements to card-based gaming devices can enhance the entertainment value of those games for users and provide manufacturers and operators a new addition to the gaming machine segment.

Using a gaming machine, historical sports statistics, and a familiar poker-style layout provides users with an easy and efficient way to enjoy the excitement of fantasy sports and the feel of video poker. However, by using a specially-designed deck, different from a typical poker deck, games may have a wide array of new gameplay possibilities and strategies, adding interest and excitement. Users can play at their own pace, receiving an immediate outcome rather than waiting for scores to be posted from real-time events. Bonuses and jackpots for special player outcomes provide the excitement of an even bigger potential payout. Operators can attract new users with sports-themed games and can adjust payouts to fit their needs rather than being tied to the probabilities inherent in a standard 52-card poker deck.

It should be noted that throughout the following discussion, to avoid confusion, the person or persons playing the game will be referred to as "user" or "users" and the athlete, sports figure, celebrity, or other type of individual or group represented within the card game will be referred to as "player" or "players". For example: "the user is dealt a card with the player, Tom Brady, displayed on the card." Game manufacturers, game designers, game technicians, casino owners, casino operators, and other personnel involved in building, maintaining and/or updating gaming machines will be referred to as "operators".

Various embodiments of the present disclosure involve a gaming system and method providing a card game wherein the playing cards in the deck represent real-world sports players. Each card in the deck represents a player and includes pre-determined scores in a set, based on a playing season or some other collection of games or matches. The scoring is similar to scoring used for fantasy sports games, where points are awarded to a player based on events in a game. The cards also include other player-related information, such as a player rank or the year or season that the scores represent. This information can be used to determine combinations among the cards.

In various embodiments, for play of a multi-user card game, the gaming system randomly selects and deals some number of cards to each user from the virtual deck of cards. In some embodiments, each user is dealt a hand of cards and then is allowed to discard some or all of those cards. The game system randomly selects replacement cards for any that the user may have discarded. After the replacement cards, if any, have been dealt, the gaming system randomly selects a score for each card from among that card's pre-determined scores.

In some embodiments, the gaming system determines whether the displayed hand of cards includes a total score that falls within the scores designated to be a winning outcome. It also determines if an individual player's score falls within the individual scores designated to be a winning outcome. The gaming system also determines if any card combinations correspond with those determined to be winning outcomes. If the hand is determined to match a winning outcome, the player receives an award amount. In addition, in certain embodiments other scoring measures are used, such as special player scores or matching of player information. In some embodiments, a scoring table or pay table is used to determine the winner of the game.

In some embodiments, the user can play against a computer-controlled dealer. In certain other embodiments the user can play against a computer-controlled opponent. In some embodiments multiple-users participate in a game. In some embodiments, the gaming system determines which participant, whether user or computer-controlled participant, had the highest score or winning score and if it is a user, that user wins the total amount wagered for that game. In some embodiments, a scoring table or pay table is used to determine the amount of money or credits a user receives for winning the game.

In some embodiments users are dealt some number of cards that are a subset of the number of the cards needed to complete a full hand. These are often referred to as "hole" cards. The gaming system then randomly selects and deals some number of community cards, which can be played as part of any user's hand. Users can wager in the rounds between the dealing of each set of community cards or of a single additional community card. In certain embodiments, as the community cards are dealt, the gaming system randomly selects and displays a score for each the users' hole cards from among that card's pre-determined scores. And as more community cards are dealt, the gaming system randomly selects a score for the previously dealt community cards, so users gain more information about their hand as the game progresses.

Once the pre-determined number of hole cards and community cards have been dealt and those cards scores displayed, the scores are tabulated to calculate a total score. The gaming system determines which user had the highest score and that user wins the total amount wagered for that game. In addition, in certain embodiments other scoring measures are used, such as special player scores, matching of player information, or collecting the most or a certain combination of player positions in a hand. In some embodiments, a scoring table or pay table is used to determine the winner of the game.

Some embodiments of the present disclosure involve a process of creating the virtual playing card decks for the aforementioned games. Given that the number of real-world players available to populate a deck far exceeds the number players required to make a viable playing deck, a method is provided to refine the available player set into the optimum number and configuration desired by operators In various embodiments of the disclosure, a computer readable storage medium is encoded with instructions for directing a gaming device to perform the above method.

BRIEF DESCRIPTION OF THE FIGURES

FIG. 6 is an illustration of one embodiment of a scoring chart used for a round of game play in the present disclosure.

FIGS. 8A, 8B, and 8C are flow charts illustrating embodiments of a process to prepare decks of cards for game play in the present disclosure

DETAILED DESCRIPTION

Figure 1:
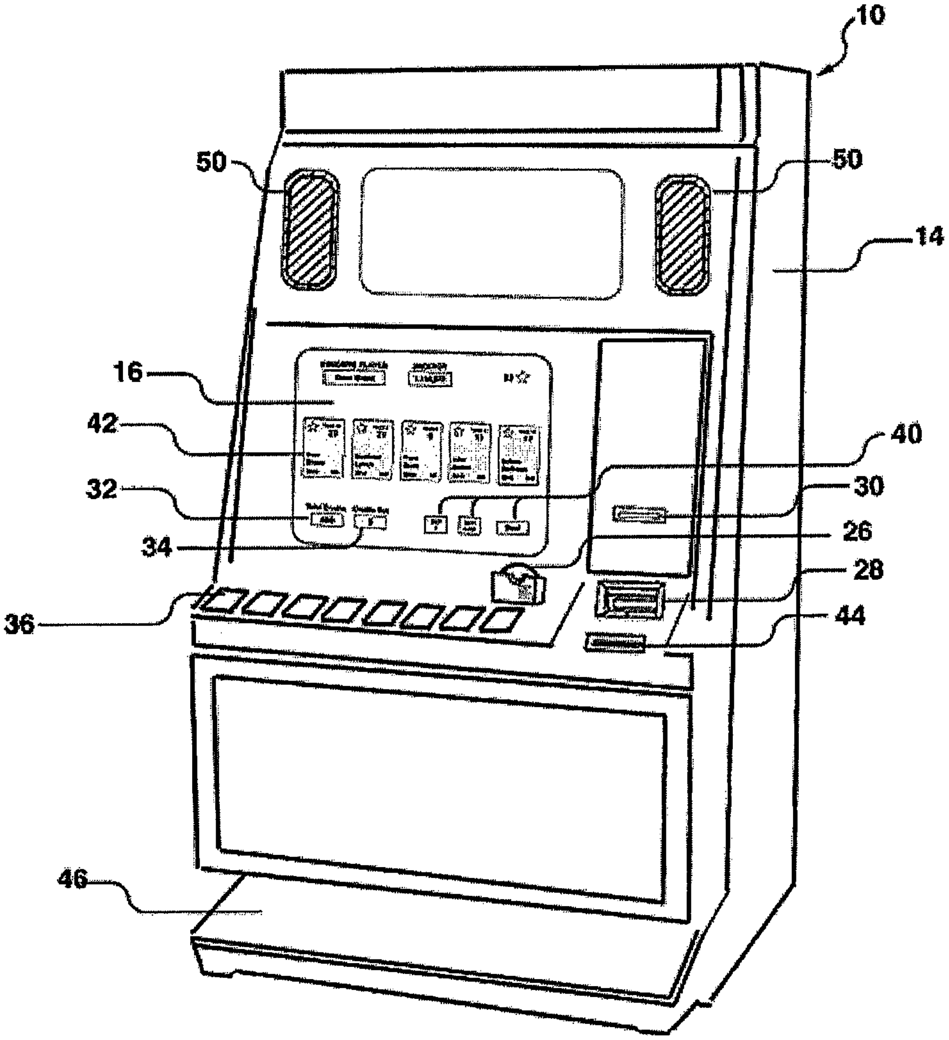
FIG. 1 is a perspective view of one embodiment of the gaming system of the present disclosure.

The description below is for a preferred embodiment of a gaming machine and gaming system using fantasy sports as the basis for scoring in its card-based games. The present disclosure may be implemented as one or more of a variety of different gaming systems each having one or more of a plurality of distinct features, attributes, or characteristics. It should be noted that "gaming system" and "gaming device" as used herein refers to various configurations of: one or more central controllers, central servers, or remote hosts; one or more electronic gaming machines; one or more electronic gaming tables; and/or one or more personal gaming devices, such as desktop computers, laptop computers, tablet computers or computing devices, mobile telephones such as smart phones, and other mobile computing devices.

If a gaming system is implemented via computer or mobile telephone, then it may involve the user downloading an "app". Apps typically run inside the operating system of the computer or mobile telephone until closed. The type of app may vary depending upon, for example, the type of mobile device or computer and its capabilities. That is, the app may be a native app, a hybrid app, or a web based app. In some embodiments the app may be configured to interact with other apps, other devices, and/or other websites. For example, in some embodiments a gaming system app may be configured to interact with a user's bank account, credit card, or some other form of payment by connecting to the gaming system app via a website or banking app or credit card app. In this manner, a user may transfer or use funds from a given account to use with the gaming system app. In some embodiments the gaming system app is configured to facilitate data routing, security, authentication, authorization, working off-line, and/or updates and service orchestration.

The present disclosure may be implemented in various configurations, including but not limited to: a casino table game, played on a physical table with physical cards dealt by a live dealer augmented by a random number generator, which could be in the form of dice, a spinner or wheel, an electronic random number generator (RNG) with a visual display, or some other method; a dedicated gaming machine, electronic gaming table, or gaming device wherein the computerized instructions for controlling games provided by the gaming machine, gaming device, or electronic gaming table are loaded into the gaming machine, electronic gaming table, or gaming device prior to delivery to a gaming establishment; a changeable gaming machine, electronic gaming table, or gaming device, where the computerized instructions for controlling games provided by the gaming machine, electronic gaming table, or gaming device are downloadable to the gaming machine or gaming device through a data network when the gaming machine, electronic gaming table, or gaming device is in a gaming establishment; and/or the software instructions for a gaming machine, electronic gaming table, or gaming device where the instructions for controlling games are downloadable through a data network to a personal computer, laptop computer, tablet computer, smart phone, personal mobile device or any other suitable computing device whether that device is within a gaming establishment or outside a gaming establishment.

Referring to the drawings, one embodiment of the gaming devices disclosed herein is illustrated in FIG. 1 as gaming device 10. In the embodiments illustrated in FIG. 1, a gaming device 10 has a cabinet, housing or other support structure which holds displays, controls, inputs, outputs, and other features of a standard gaming machine. The gaming device 10 may have varying cabinet and display designs. It can be configured so that a user can operate it while sitting or while standing. In some versions, the device could be configured to sit on a table top as a "pub-style" game. In certain embodiments, the gaming machine may be a desktop computer, a laptop computer, a tablet computer, a hand-held device, a mobile device or any other wired or wireless device that enables a user to play any suitable game by downloading it.

Figure 2:
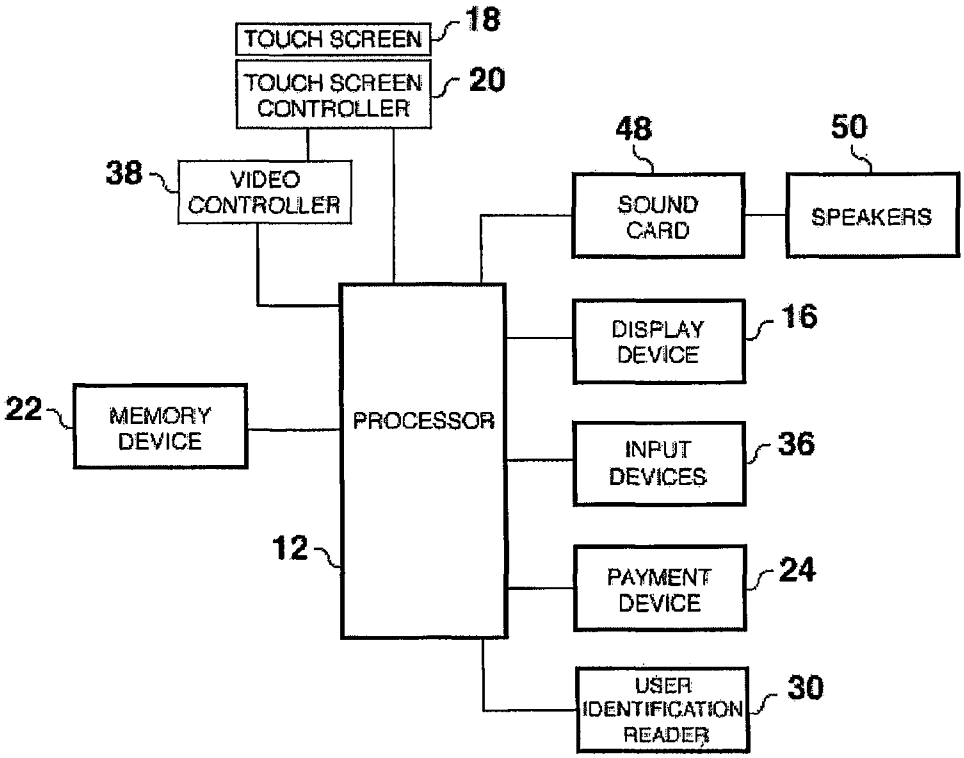
FIG. 2 is a block diagram of the electronic configuration of one embodiment of the gaming device of the present disclosure.

In some embodiments, as illustrated in FIG. 1 and FIG. 2, the gaming device includes one or more display devices controlled by the processor 12. These display devices are typically connected to and/or mounted into the cabinet 14 of the gaming device. The exemplary embodiments include a central display device 16 which displays a primary game. This display device may also exhibit one or more secondary games associated with the primary game and may also display any information relating to the primary or secondary game.

The primary display 16 may be in the form of a cathode ray tube (CRT), a high-resolution LCD, a plasma display, a light emitting diode (LED) display, a DLP projection display, an electroluminescent (EL) panel, or any other suitable electronic device or display mechanism. The display device or devices may be of any suitable size and configuration, such as a square or a rectangle, with any suitable aspect ratio. The display device 16 or devices may include a touch screen 18 with an associated touch screen controller 20.

The display device or devices of the gaming device 10 are configured to display at least one and preferably a plurality of game or other images, symbols, and distinguishing marks such as any visual representation of the movement of objects, dynamic lighting, video images, images of people, characters, numbers, places, and things.

In one embodiment, as illustrated in FIG. 2, the gaming device 10 is controlled by a central processing unit (CPU) 12 such as a microcontroller, a microprocessor, an integrated circuit or one or more application-specific integrated circuits (ASIC's). The CPU, also referred to herein as a controller or processor, communicates with at least one data storage or memory device 22. The memory device 22 may include a volatile memory (e.g., a random-access memory [RAM]) and a non-volatile memory (e.g., an EEPROM). The system memory 22 may include multiple RAM and multiple program memories. Any other appropriate magnetic, optical and/or semiconductor memory may operate in conjunction with the gaming device. The processor(s) and memory device(s) described herein may be collectively referred to as a "computer" or "controller."

In certain embodiments, the processor and the memory device reside within the cabinet 14 of the gaming device 10. The memory device stores program code and instructions, executable by the processor, to control the gaming device 10. The memory device also stores other data such as image data, event data, user input data, random or pseudo-random number generators, pay-table data or information and applicable game rules that relate to the play of the gaming device 10.

However, these components may be located outside of the housing or cabinet 14 and connected to the remainder of the components of the gaming machine 10 via a variety of different wired or wireless connection methods.

In some embodiments, part or all of the program code and/or operating data described above can be stored in a removable memory device, including a disk, CD ROM, DVD, USB memory device, cartridge or other memory device or configuration. In other embodiments, part or all of the program code and/or operating data described above can be downloaded to the memory device through a network.

In certain embodiments, in order to implement the present disclosure, a user can utilize a removable memory device in a desktop computer, a laptop personal computer, a portable computing device, or other computerized platform. In certain embodiments, the gaming device or gaming machine can be operated over a wireless network, so as to be part of a wireless gaming system. In these embodiments, the gaming machine may be a hand-held device, a mobile device or any other wireless device that enables a user to play a game by downloading it.

In some embodiments, the controller 12 performs the random selection (using a random number generator (RNG) such as a true random number generator, a pseudo-random number generator or other suitable randomization process. Alternatively, the random event may be determined at a remote controller. The remote controller may use either an RNG (such as a true random number generator, a pseudo-random number generator or other suitable randomization process) or pooling scheme for its determination of a game outcome As illustrated in FIG. 2, in certain embodiments, the gaming device 10 includes at least one payment acceptor 24 that works in communication with the processor. The payment acceptor, as illustrated in FIG. 1, may include a coin slot 26 and a payment, note, or bill acceptor 28, where the user inserts money, coins, tokens or other physical currency. The user can place coins in the coin slot or the user may put paper money, a voucher or a ticket into the payment, note or bill acceptor. In other embodiments, payment may be accepted by devices such as readers or validators for credit cards, debit cards or credit slips. In certain embodiments, a user may insert an identification card into a card reader 30 of the gaming device 10. The card reader has the ability to read a magnetic strip or a programmed microchip on or within the identification card. In certain embodiments, the identification card is a card with a user's identification, credit totals and other related data. In other embodiments, a user may carry a portable device, such as a cell phone, a radio frequency identification tag or any other suitable wireless device, which communicates a user's identification, credit totals, and other related data to and from the gaming device 10. In certain embodiments, money may be transferred to a gaming device 10 through electronic funds transfer from a suitable wireless device.

As seen in FIG. 1, in some embodiments, the gaming device includes a credit display 32 which displays a user's current number of credits, cash, account balance or the equivalent. When a user funds the gaming device 10, whether with coins, currency, vouchers, tickets, credit or debit card, electronic funds transfer, or some other method, the processor determines the amount of funds entered and displays the corresponding amount on the credit or other suitable display. In certain embodiments, the gaming device includes a bet display 34 which displays the amount the user has wagered.

In certain embodiments, the gaming device 10 includes at least one and preferably a plurality of input devices 36 that work in communication with the processor. The input devices can include any appropriate device or method which enables the user to send an input signal which is received by the processor. In certain embodiments, one of the input devices acts as a play button which starts any primary game or sequence of events in the gaming device 10. The play button may be any suitable game play activator, including, but not limited to, a bet one button, a max bet button, a repeat the bet button, a start button, or a deal button. In one embodiment, upon appropriate funding, the gaming device 10 automatically begins game play.

As mentioned above, one or more of the input devices may be designed as wagering or bet buttons. The user can place a wager by pushing a bet one button (which bets one credit and can be pressed repeatedly to increase the bet up to the maximum allowed) or a max bet button (which allows the user to automatically bet the maximum amount allowed for a game) or a repeat bet button (which allows the user to repeat the same wager amount he or she had bet on the previous game). When the user pushes a bet button, the number of credits shown in the credit display preferably decreases by the amount of that wager, and the number of credits shown in the bet display preferably increases by the amount of the wager.

In certain embodiments, as mentioned above and seen in FIG. 2, one input device is a touch screen 18 coupled with a touch screen controller 20, or some other touch sensitive display that allows for user interaction with the images on the display. The touch-screen and the touch-screen controller are connected to a video controller 38. A user can input signals into the gaming device 10 by touching the touch screen at the appropriate places. The touch keys associated with the touch screen 18 may be used to implement the same functions as push buttons 36 whether the push buttons are present or not. In certain embodiments, the push buttons 36 may provide inputs for one aspect of the operating the game, and areas of the touch screen may allow for input needed for another aspect of the game. For example, in some embodiments, the inputs for bet one, bet max, and deal are touch-activated areas 40 on the primary display 16. In other embodiments, the card images on the primary display 42 are touch-activated areas.

In certain embodiments, one input device 36 works as a cash out button. The user may push the cash out button and receive a payment in cash or in some other suitable form of payment corresponding to the number of remaining credits. In certain embodiments, when the user presses the button, a payment device, such as a ticket, payment or note generator 44 prints or otherwise produces a credit slip that the user may redeem via a cashier (or other suitable redemption system). In other embodiments, when the user presses the cash out button, the user receives the coins or tokens in a payout tray 46. It should be appreciated that any suitable pay out mechanisms, such as transferring funds to the user's electronically recordable identification card or to the user's smart phone via a wireless connection may be implemented in accordance with the gaming device disclosed herein.

The gaming device 10 may also include a plurality of communication ports for enabling communication by the processor with external peripherals, which could include external video sources, external memory, expansion buses, game or other displays, other communication ports, or a key pad.

In certain embodiments, as seen in FIG. 2, the gaming device 10 includes one or more sounds cards 48 which work in conjunction with the processor to control a sound generating device. In some embodiments, the sound generating device includes at least one and preferably a plurality of speakers 50. It also includes sound generating hardware and/or software for generating sounds, such as playing music, sound effects, voice recordings, and/or voice effects. The sound generating hardware and software can also be used for playing sounds for other modes of the gaming device 10, such as when the game is idle.

Figure 3:
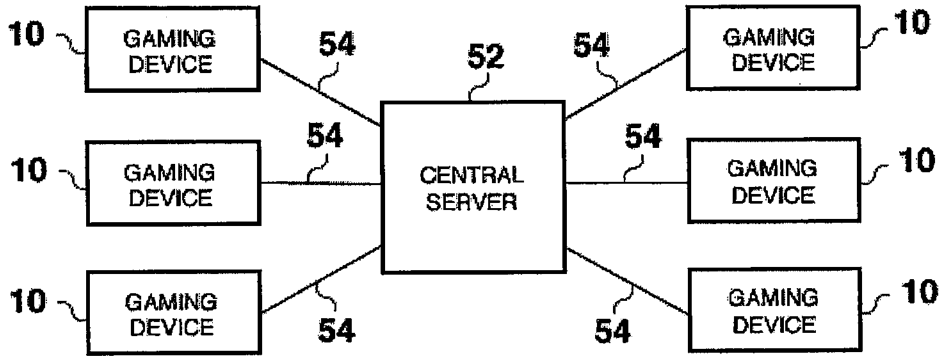
FIG. 3 is a block diagram of a data network that could connect one or more of the gaming devices of the present disclosure.

Turning to FIG. 3, in certain embodiments one or more of the gaming devices 10 communicate with each other and/or at least one central server, central controller or remote host 52 through a data network or communication link 54. The central controller, central server or remote host includes at least one processor and at least one memory device. The central server's processor is devised to receive and transmit commands, events, messages, or any other data or signal between the central server and each of the individual gaming devices. The central server processor is capable of executing and communicating these commands, events, messages or other data as part of the operation of the central server.

In certain embodiments, the computerized instructions for controlling any games are communicated from the central server, central controller or remote host to a gaming device's local processor and memory devices. In these embodiments, known as "thick client", the gaming device's local processor executes the communicated computerized instructions to control any games (or other suitable interfaces) provided to a user. In other embodiments, the computerized instructions for controlling any games are executed by a central server, central controller or remote host. In these embodiments, known as "thin client", the central server, controller or host remotely controls the games (or other suitable interfaces) and the gaming device displays such games (or suitable interfaces) and receives one or more inputs or commands from a user.

In certain embodiments, the game may be provided over a network such as the Internet. In other embodiments, the game may be provided for use on personal gaming devices, such as desktop computers, laptop computers, tablet computers or computing devices, mobile telephones such as smart phones, and other mobile computing devices. In these embodiments, the user downloads the game to a computing device or devices and is able to play the game in a separate location from the actual gaming establishment. In addition, in a multiuser embodiment, several users can connect to a central server and play the game with several other users that are playing at different locations.

Referring now to FIGS. 4-7, an example of the operation of one embodiment of the card-based wagering game will be described. In this embodiment, the user is dealt 5 cards, however in other embodiments, it could be 3,4,6,7 or some other number of cards. In the example embodiment, the five cards represent 5 different player positions of NFL football teams. However, the cards could represent players any number of competitions, including but not limited to: American football, basketball, baseball, soccer (association football), ice hockey, cricket, auto racing, rugby, golf, tennis and could also include players from competitions involving animals (e.g., horse racing or dog racing). In certain embodiments there may be a plurality of different sports represented in a single deck.

Figure 4A:
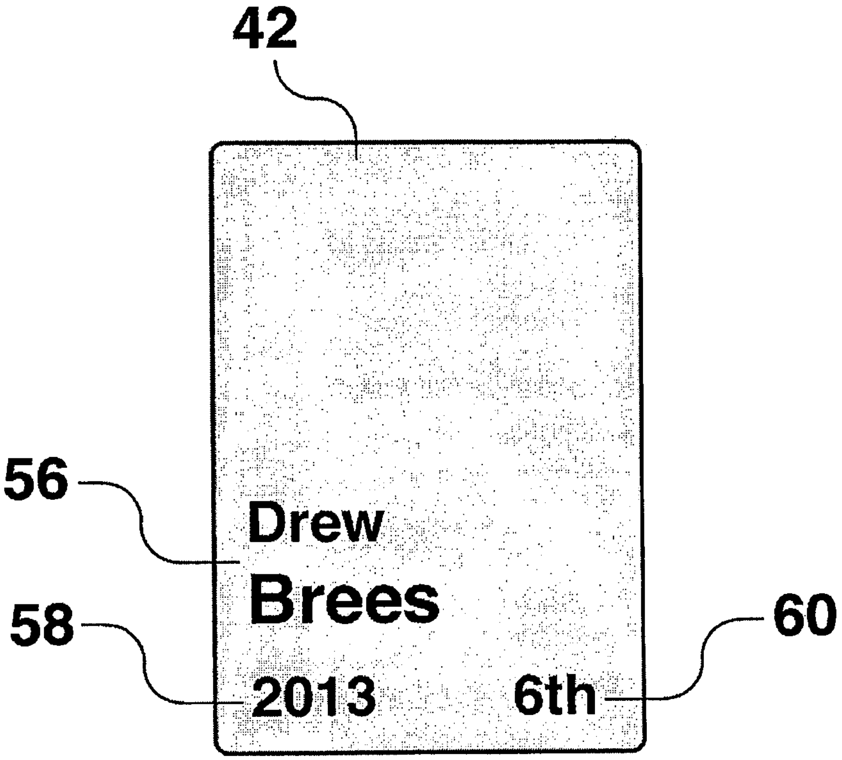
FIGS. 4A and 4B are illustrations of embodiments of a card used for a round of play of the game in the present disclosure.

In certain embodiments, the cards are dealt from a virtual deck of specially-designed cards. As seen in FIG. 4*a*, these cards include information such as the player's name 56, the year, playing season or other scoring period for that player 58, and the player's rank within the current deck among other players of that same position 60, and in some embodiments, cards could also include the player's image, team name, team colors, player's jersey number, or other distinguishing information about the player.

Figure 5:
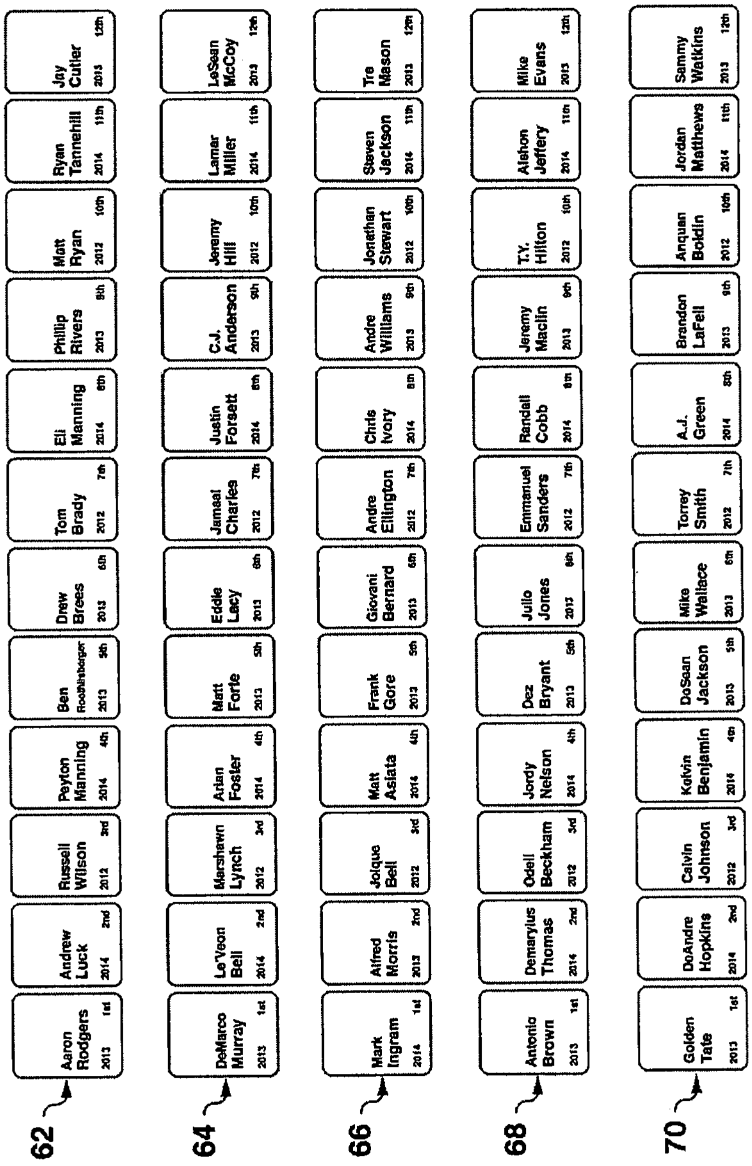
FIG. 5 is an illustration of one embodiment of a deck of cards used for a round of game play in the present disclosure.

As seen in the embodiment of FIG. 5, a virtual deck represents a group of National Football League players. There are 12 quarterbacks 62, 12 first-level running backs (referred to a RB1s) 64, 12 second-level running backs (referred to as RB2s) 66, 12 first-level wide receivers (referred to a WR1s) 68, and 12 second-level wide receivers (referred to as WR2s) 70. It should be noted the deck displayed in FIG. 5 is just one example of a deck that could be used in the game. There could be some other number of cards in the deck, based on the game configuration. There could be 6,7,8,9,10,11,13,14,15,16 or some other number of player cards per type or position (i.e. per row in FIG. 5). Also, besides other sports being used for a deck, within the same sport there can be many multiples of different configurations to a deck based upon the operator's needs or desires for different players, different seasons, different positions, and, importantly, different desired probabilities of outcomes.

In one non-limiting example of this process, prior to any users playing a game a virtual deck is created for game play. To create a deck a set of scores are collected for each player to be represented in the deck. The scores collected are created from actual player actions within real-world games, calculated using a fantasy scoring formula. For example, if a quarterback throws a touchdown pass in an NFL game, that quarterback may receive 6 "fantasy points" for scoring purposes. It will be understood that alternative scoring formulas may additionally or alternatively be utilized. During the course of an entire game a quarterback could score points for, for example, passing for a touchdown or for running for a touchdown or for the total number of yards for passes completed, based on a formula. After the game is over, those fantasy points are totaled to create a single fantasy score for the player for that game. In this example, the quarterback would receive 1 point for every 25 yards of passes completed (rounded to floor integer). On Nov. 21, 2013 in Week 12 of the 2013 NFL season, quarterback Drew Brees threw two touchdown passes, and he threw 278 yards worth of completed passes. For this example of scoring, two touchdowns equals 12 points and 278 yards of completed passes equals 11 points. So, for Week 12 of the 2013 season Drew Brees had 23 fantasy points. Similar scoring is calculated for every other game Drew Brees played during the 2013 season or any other season or combination of seasons. And similar scoring (using position-specific formulas) is calculated as well as for every other player for certain positions (for this example, quarterbacks, running backs, and wide receivers) in the NFL for that season.

A deck being created, for example, to represent the 2013 NFL season would include data for selected players from selected positions, drawn from a pool of all the players from that season. For each player in the deck, there would be a set of fantasy scores (generated as described above) and a corresponding set of weeks that those scores occurred. In this exemplary version, the deck is made up of 5 positions (QB, RB1, RB2, WR1, WR2). For each of those positions there are 12 players represented for a total of 60 cards. In this example, each of those player cards has 12 scores from that 2013 season. Also, in this example, the highest fantasy score the player obtained for the season is noted. In some embodiments, this high score may be used for certain scoring, special scoring, and/or bonus purposes, as will be noted below.

As seen in the embodiment of FIG. 6, a scoring chart 72 includes the player's name 74 and the season 76 to which the chart pertains. It also includes a set of numbers 78, a set of weeks 80, and a set of points 82. In the example embodiment in FIG. 6, each week and point amount is generated from statistics accumulated by real players in actual sporting events, in this case NFL football games, and the points 82 are calculated based on the real player's actions in a sporting event or events. The week 80 represents the week of the playing season when the events used for that corresponding score occurred. In the example embodiment, the player's best score for that season is noted 84 in the chart. The season high score can be used in some embodiments for scoring and bonus purposes.

When it is time to score a hand, a random number is generated or pulled from a pool of numbers, and the score for that player for that hand is matched based on the random number. It should be appreciated that the chart in FIG. 6 is for illustration purposes, and in some embodiments, the weeks, points, corresponding numbers, and other information is stored in a computer's memory device and accessed by the processor for comparison with a randomly generated number without the information being displayed to the user. Depending on the set up of the particular game, none, some or all of a version of the scoring charts are shown to the user.

Figure 7A:
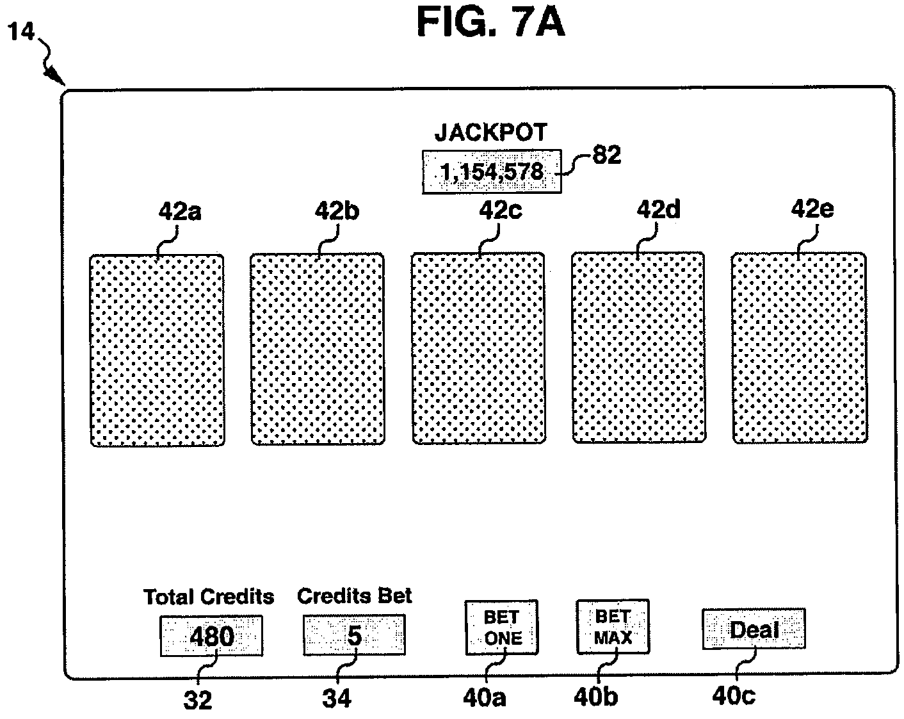
FIGS. 7A, 7B, 7C, 7D, 7E, 7F, 7G, 7H, 7I, 7J, and 7K are illustrations of embodiments of screen displays for a round of play of the game in the present disclosure.

Turning now to FIG. 7A, an initial screen of the primary display 14 of the gaming device 10 is described. The initial screen includes the backs of five cards 42 arranged for a first hand. In some embodiments, the playing area is empty before a hand is dealt. In some embodiments the cards are immediately dealt face up as soon as the hand begins. The primary display 14 also includes a credit display 32 and bet display 34. The credit display 32 illustrates how many credits a player has remaining in the gaming terminal 10. The credit display 32 increases whenever the player wins credits and decreases whenever the player makes a wager. The bet display 34 indicates how many credits the player is wagering on that particular game.

In the screen described in this embodiment, the Bet One area 40*a*, the Bet Max area 40*b*, and the Deal area 40*c*, are all touch-activated areas on the screen. The user can place a wager by pushing the Bet One area 40*a* (which bets one credit and can be pressed repeatedly to increase the bet up to the maximum allowed) or the max bet area 40*b* (which allows the user to automatically bet the maximum amount allowed for a game). In the embodiment being described, when the user is ready to play a hand of the game he or she touches the Deal area 40*c* to begin the hand. In some embodiments, if the user touches the Bet Max area, the hand begins immediately. In the embodiment being described, the screen also includes a jackpot counter 86 that displays the current credits available if the user wins a jackpot. A jackpot can be won in various ways, depending on the configuration of the game being played.

Figure 7B:
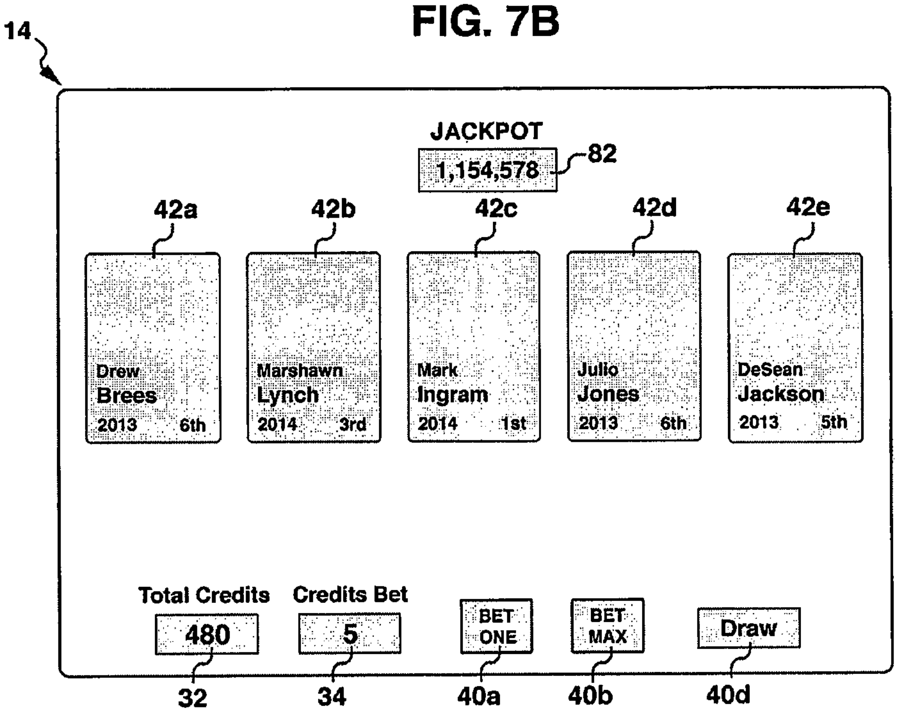

Once the hand has begun, the user sees the cards for the initial hand face up as shown in FIG. 7B. The user can choose to hold all, some, or none of the cards dealt. In some embodiments, the user can touch the card on the screen to indicate that he or she would like to hold a card. In some embodiments, the user presses a button 36 as shown in FIG. 1 to indicate that he or she wants to hold a card. In one embodiment, once the user has selected any cards he or she wishes to hold, the user touches the Draw area 40*d*. Any cards that were not held are replaced by new cards.

Figure 4B:
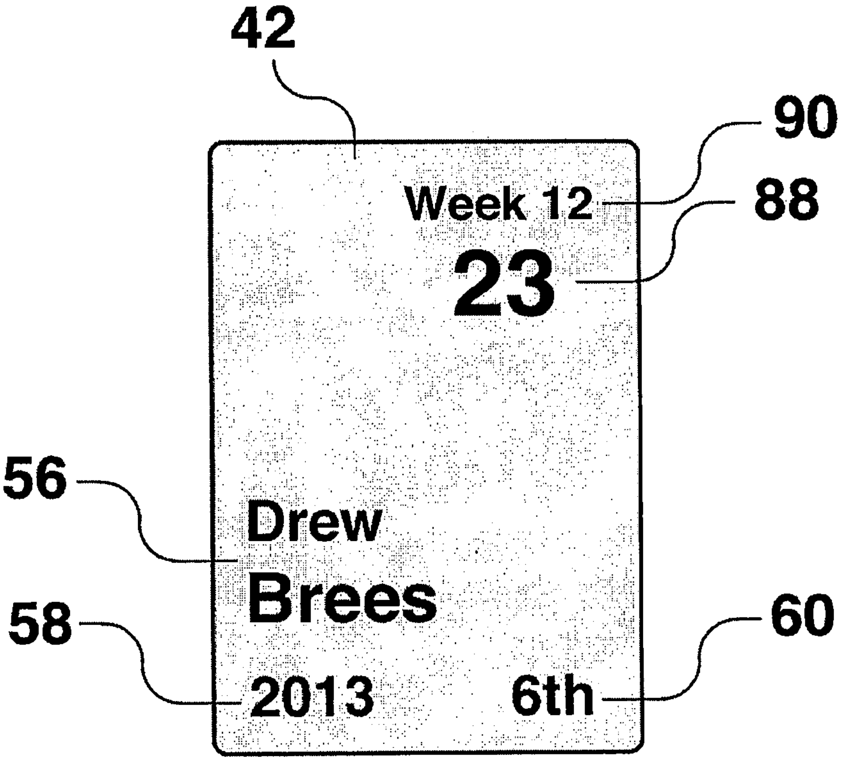
Figure 7C:
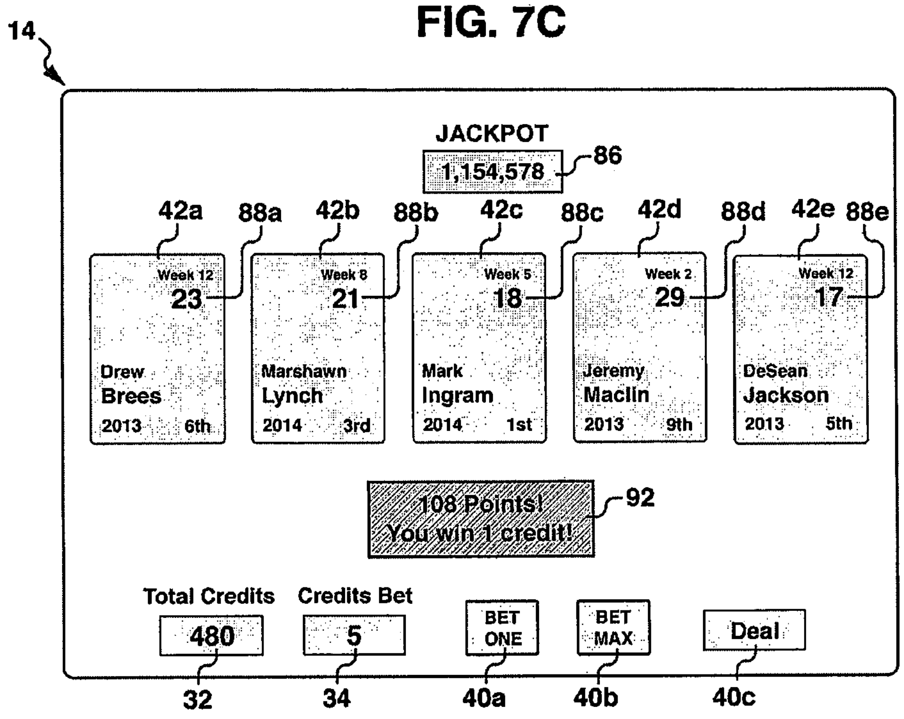

As shown in the embodiment illustrated in FIG. 7C, the user has received a new card in the spot that is second from the right 42*d*. And the scores 88*a-e* for each of the cards has been displayed. Turning now to FIG. 4B, an exemplary embodiment of the scoring display is described in detail. The score 88 and week 90 for that score are displayed on the card. As previously mentioned, the score is selected at random from the group of scores associated with that player card. Using the examples in FIG. 6 and FIG. 7C, on the card representing the player Drew Brees 42*a*, the score 88*a* that appears for that player was selected from the player's scoring chart FIG. 6, 72. In this example, to get a score for the Drew Brees card in this hand, a random number between 1 and 12 is generated, because this Drew Brees card for the 2013 NFL season has 12 different scores to choose from. In this example, the random number is 9. And on the list of scores for Drew Brees for the 2013 season, 9 corresponds with week 12 of the season where Brees scored 23 fantasy points. As displayed FIG. 6 from the column of numbers 78 corresponding week 80 is "week 12" and the corresponding score 82 is "23".

In some embodiments, the score area 88*a-e* is animated to simulate spinning or some other movement prior to the score being displayed. In some embodiments, the timing of the score display for each card is staggered to heighten the excitement. In addition, in some embodiments there is a sound or sounds associated with the animation and display of the scores.

As shown in the embodiment illustrated in FIG. 7C, once a score is determined for each card, the scores are added up for an overall score. In the present embodiment, that score total is displayed in a message to the user 92. In addition, that score is matched to a pay table (see Table 1) to determine if the user has won and if so, how much he or she should be paid. In the example embodiment, a message regarding the outcome of the wager is included in the message display 92.

In some embodiments, the total score could be added to a total score display as each card score is revealed, reaching the final total after all the card scores have been revealed.

Figure 7D:
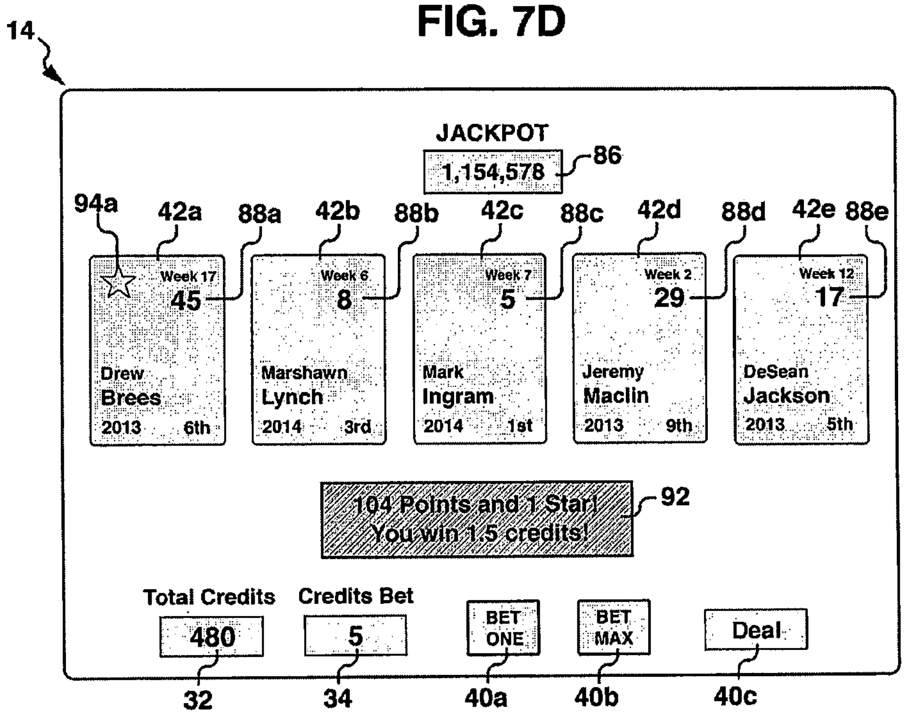

In certain embodiments, such as the embodiment described in FIG. 6, a special note is made of the player's best score 84 for the scoring set 72. If the score randomly selected from the player's score set is the best score, a symbol or other notification will appear on the player's card when the score is displayed. In the exemplary embodiment, as seen in FIG. 7D the symbol is a star 94*a*. As can be noted in Table 1, in some embodiments, player card high scores are used in determining payouts.

In this example, the use of the highest score is demonstrated. For example, if the randomly-generated scoring number between 1 and 12 for the Drew Brees card is 12, that corresponds to week 17 of the 2013 season on the Brees card. When scoring the hand, the user will receive 45 points as well as an indication (in this example represented by a star) that it is Brees's high score for that season.

In this example embodiment, the highest score is an important component of the scoring system because it adds more scoring opportunities for the user. As seen in Table 1, a user can earn a payout for total points and/or for highest scores (noted as "stars" or special scores). The probabilities can be calculated for a hand receiving individual player high scores vs surpassing certain total point thresholds, and a pay table can be created to pay the user based on those probabilities.

Figure 7E:
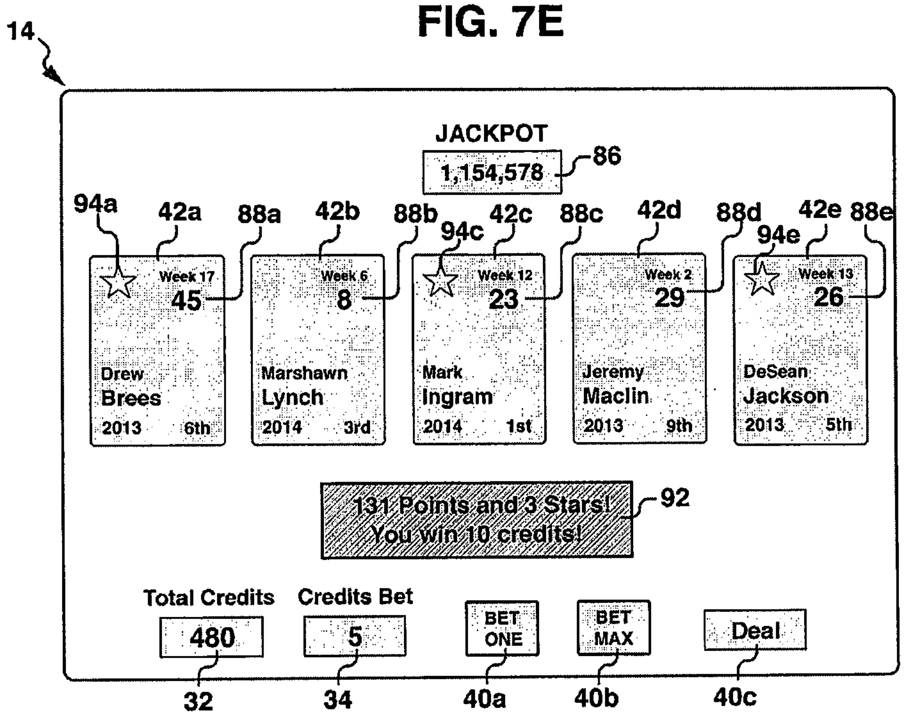

As exemplified in FIG. 7E, users can earn multiple player high scores in one hand of play, resulting in high score symbols appearing on multiple cards 94*a*, 94*c*, 94*e*. As can be noted in Table 1, a user hand that has player point totals adding up to over 125 points will receive a payout of 5 times their bet whereas a user hand that has three individual player high scores (called stars in Table 1) will receive a payout of 10 times their bet because in this example that probability is lower.

As exemplified in FIG. 7E, users can earn multiple player high scores in one hand of play, resulting in high score symbols appearing on multiple cards 94*a*, 94*c*, 94*e*.

Figure 7F:
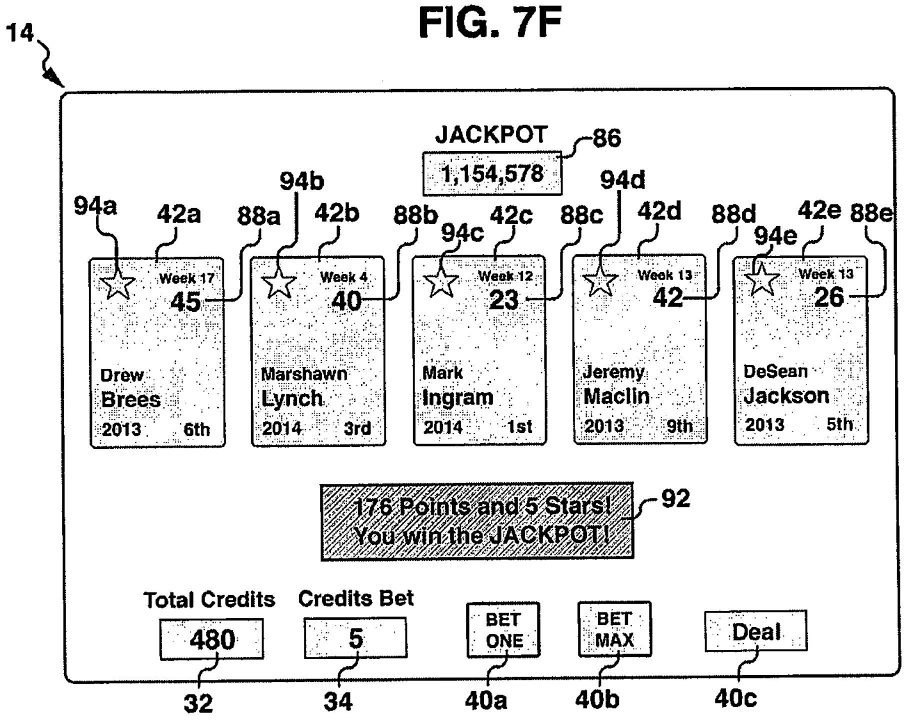

Turning now to FIG. 7F, in some embodiments if the user is dealt or draws cards that get five high scores 94*a*, 94*b*, 94*c*, 94*d*, 94*e*, the user wins a jackpot. In some embodiments, the jackpot amount 86 is shown on the display screen 14. In some embodiments, the jackpot starts at a base level of credits and increments upward over time until a user receives the appropriate scoring to earn the jackpot. Once a user earns the jackpot, the jackpot returns to its base level and begins to increment upwards again.

It should be appreciated that winning a jackpot by earning five player high scores is only one of many embodiments of the invention, and other methods may include, but are not limited to, matching some other score other than the highest score, for example receiving a hand with the worst or lowest scores for each player card, matching a randomly chosen score level (for example, third best score for all the players), matching the same week, or some other identifying information, for all the players. In some embodiments, the user must wager a certain amount in order to be eligible for a jackpot. In some embodiments the user must make an additional wager to be eligible for the jackpot.

TABLE 1

Exemplary Pay Table

| Hand | Payout |
|---|---|
| Over 100 points | 1 |
| Over 100 points & 1 star | 1.5 |
| Over 110 points | 2 |
| 2 stars | 4 |
| Over 125 points | 5 |
| Match all years | 7 |
| 3 stars | 10 |
| Over 135 points | 20 |
| 4 stars | 50 |
| 5 Stars | 5000 |
| 5 stars at Max Bet | Jackpot |

In some embodiments, a plurality of gaming devices are linked in a network and an overall jackpot is linked between the machines. The user whose scoring matches the correct criteria wins this linked overall jackpot.

Figure 7G:
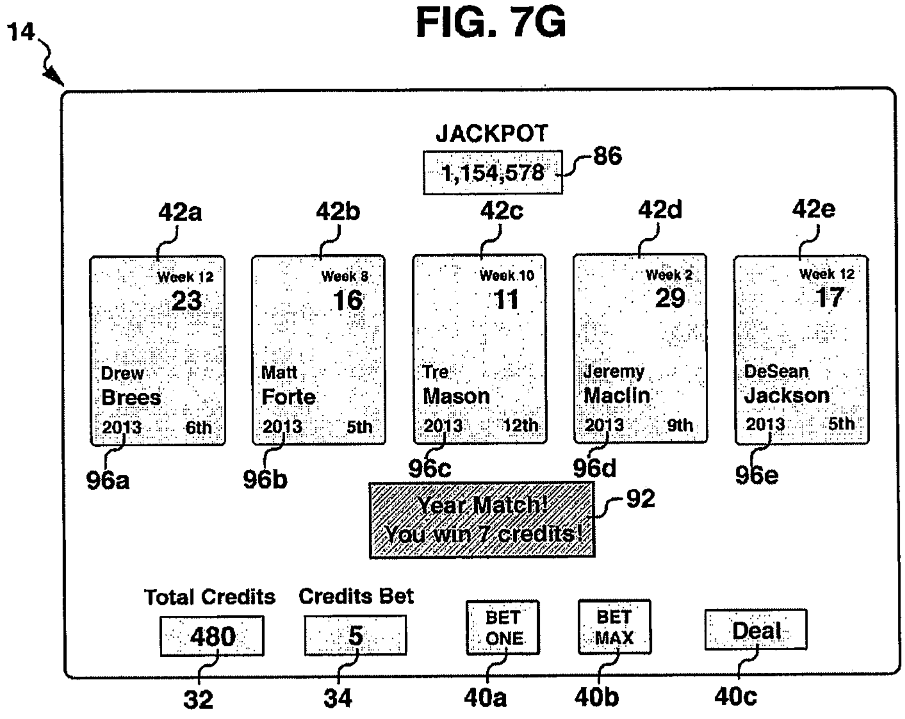

In certain embodiments, as shown in FIG. 7G, if the user's cards have matching years or seasons (or some other sub-set of the overall set) 96*a*, 96*b*, 96*c*, 96*d*, 96*e*, that information can be used in determining payouts.

Figure 7H:
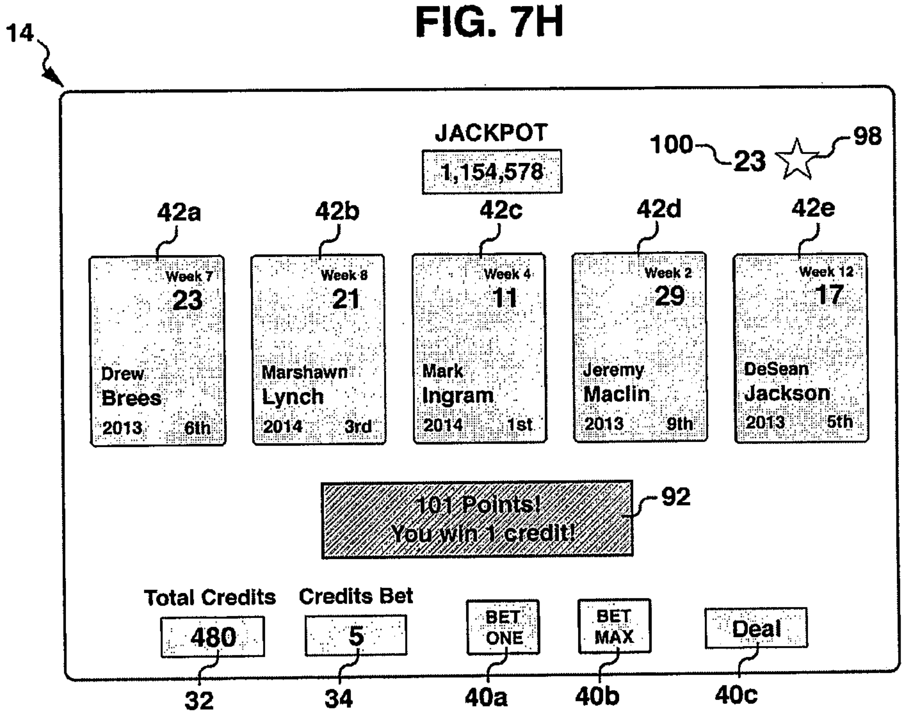
Figure 7I:
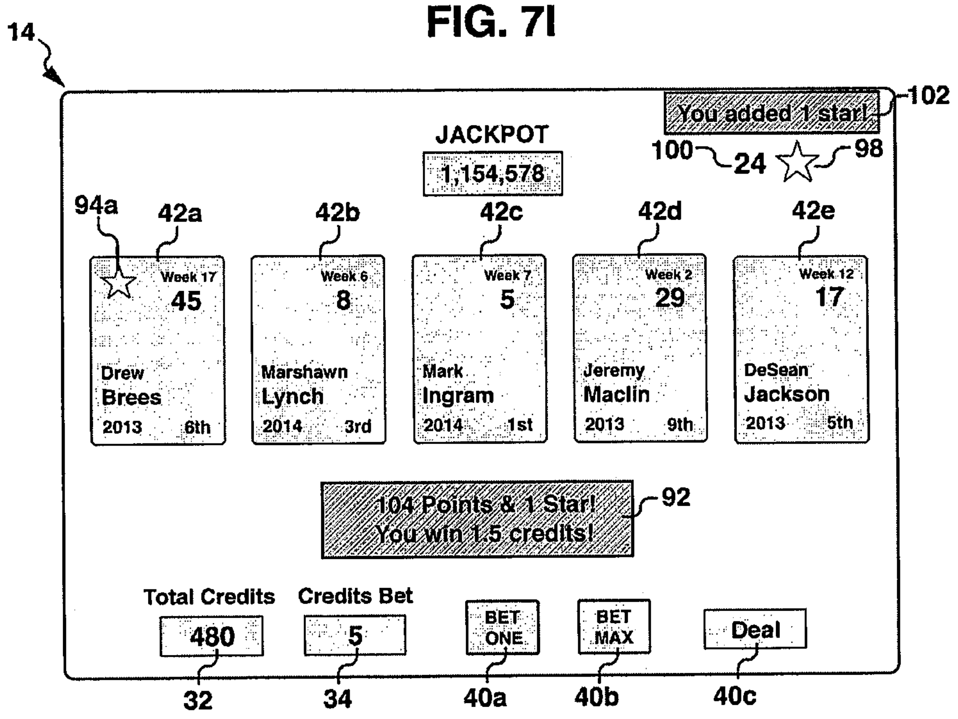

In some embodiments, when a user's player card has a designated special score, for example, but not limited to, the player's best or the player's worst for that year, season, partial season or other scoring set designation, the user earns a special credit that can be accumulated or carried over from one hand to the next hand. Turning to FIG. 7H and FIG. 7I, an example of one embodiment can be seen. In FIG. 7H, a visual representation of the special scoring symbol 98 and a numerical representation 100 of the amount of special credits earned appear in the upper right-hand corner of the screen. In FIG. 7I, the user has scored one player high-score, in this case represented by a star 94*a*. The user's special credits 100 are incremented by one, and the user is notified by a special message 102. In some embodiments, the user receives one special credit for each player's designated special score in a hand. In some embodiments, the user could receive a random bonus number of special credits based on the number of player's designated special scores in a hand. For example, if the Drew Brees card randomly receives its highest score, not only does that scoring affect the user's current hand, the star is also tallied for an ongoing total of stars the user accumulates as he or she continues to play more hands of the game.

In certain embodiments, when a user reaches a certain threshold of special credits, the user could receive additional game credits. In some embodiments, the user would need to have reached a certain threshold of special credits in order to be eligible for jackpots, bonuses, secondary games, other special games, or other incentives or payouts.

In certain embodiments, these special credits may be stored on the user's identification card that is read by the card reader 30 of the gaming device 10. The special credits could be collected over time and read by the card reader 30 any time the user uses the identification card when playing the game. In other embodiments, a user may carry a portable device, such as a cell phone, a radio frequency identification tag or any other suitable wireless device, which would store the user's special credits and communicate with the gaming device 10.

In some embodiments, the player rank appears on the card. The rank could be based on that player's average score for the set of all scores used for that player's card. Players within the same position group, for example, quarterbacks, are ranked against one another based on the scoring average. Referring to FIG. 5 in the example deck, Aaron Rodgers average score (not shown) is 25, Andrew Luck's average score is 24, and Russell Wilson's average score is 23. So they are ranked 1st, 2nd, and 3rd for the quarterback group. Ranks can be used for matching purposes, such as if all of the cards in a user's hand have the same rank or the ranks increment sequentially among the cards in the user's hand. In such embodiments the user's hand could be determined a winner via the pay table. Ranks are also helpful to the user when he or she is deciding which player card to hold and which player card to discard.

In some embodiments, the user can receive a bonus if he or she selects the lowest ranked player of a position (in some embodiments known as a "sleeper"), for example the lowest ranked quarterback of the group of quarterbacks in the deck. In some embodiments, the user receives the bonus for scoring above a certain threshold of points while using the lowest ranked player. The bonus could be an additional payout of credits, additional special credits, access to a secondary game, or some other bonus.

Figure 7J:
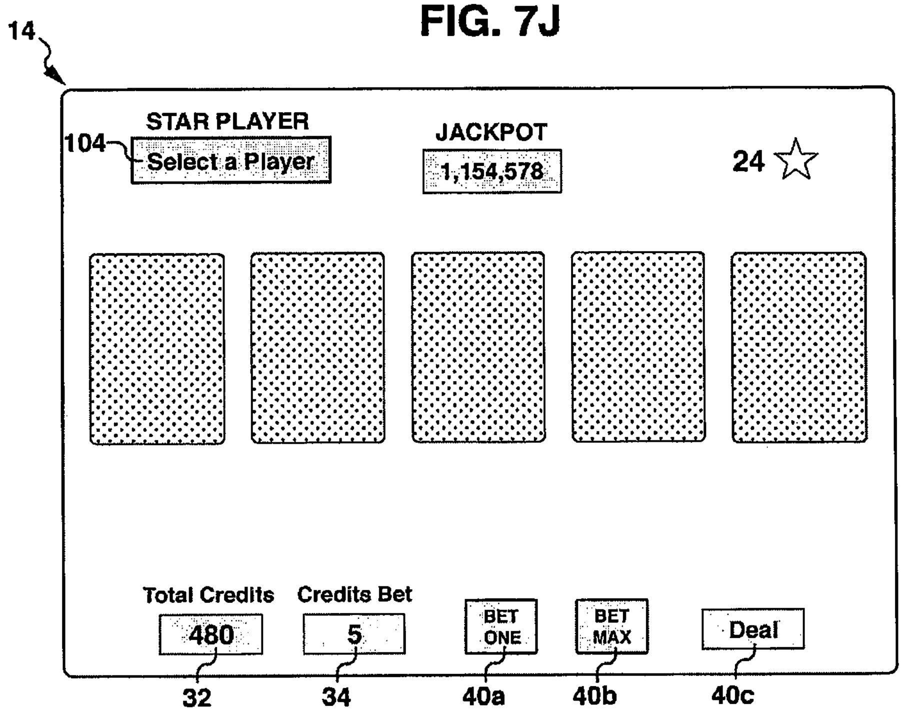
Figure 7K:
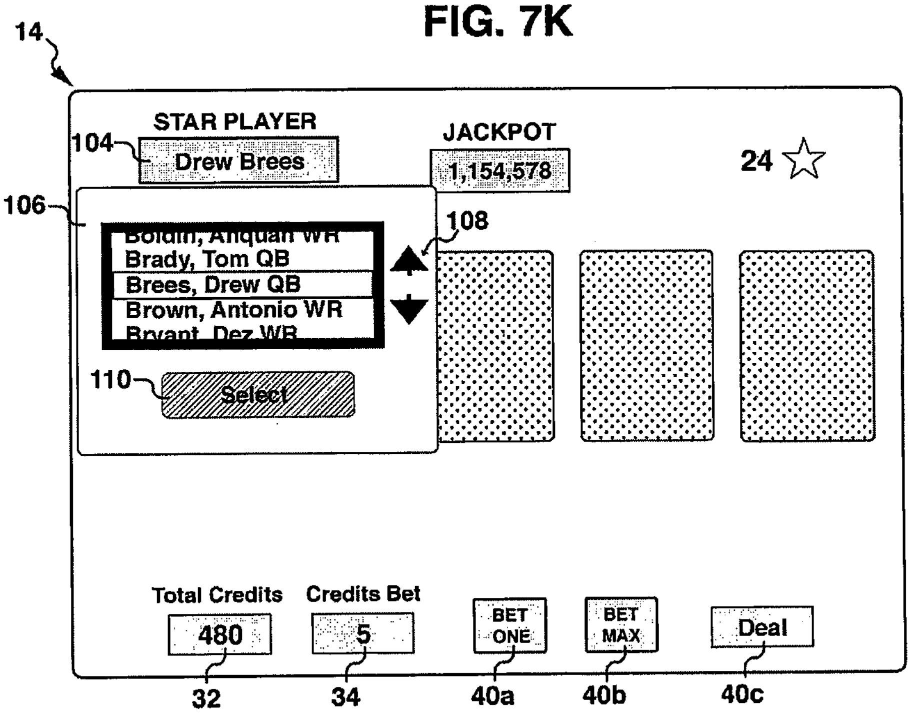

In some embodiments, as can be seen in FIG. 7J and FIG. 7K the user can select a Star Player 104 for a hand or for multiple hands to use as an additional chance for bonuses in the game. As shown in the embodiment of FIG. 7J, the user selects a Star Player prior to the start of a hand by touching the "Select a Player" area 104. As seen in FIG. 7K, touching the "Select a Player" area makes the "Star Player" menu 106 appear on the display screen 14. The user can touch the "Star Player" menu arrows 108 to scroll up and down to find a player. Once the user has found a player, the user touches the "Star Player" menu select button 110 to add the star player to the "Star Player" display 104.

Once the star player is selected, the hand proceeds as previously described. If the user is dealt and/or draws that star player, and the star player gets a special score the user can earn bonus credits. In some embodiments, that special score could be the player's best score for that player's set of scores for the current deck. In some embodiments that special score could be a random score or random week from that player's set of scores for that deck. In some embodiments, the user would earn bonus special credits. In some embodiments, the user would earn access to special games or special jackpots. In some embodiments, the user could receive a special audio or video message from the star player. In some embodiments the user could win a physical object, such a t-shirt, jersey, photo, autograph, or some other item.

In some embodiments, the user could store information regarding previously selected star players on his or her identification card or portable device. Using the identification card or portable device, the user could earn, store and retrieve special credits or other bonus information related to that star player or star players which could be communicated to the gaming device 10.

In some embodiments, a star player 104 can be assigned randomly, using a random number generator or some other method, rather than selected by the user. In some embodiments the user could select a star player at some time other than when playing the game, for example by using a personal computer or a mobile device to select and store a favorite player to the user's personal identification profile.

In some embodiments, the user could select a star player prior to beginning any hands of the game. In such an embodiment, the virtual deck used for the upcoming hand could be retrieved from a memory device or specifically generated based on the star player chosen by the user, so that deck would include the star player. In embodiments that allow the user to store a star player or star players on an identification card or portable device, the virtual deck for upcoming hands could be retrieved from a memory device or specifically generated so as to include that particular star player.

In some embodiments, the user can select his or her favorite team prior to playing a hand. If the user receives a card or cards with a player or players from that team, and the user's hand scores above a certain threshold of points the user is eligible to win a bonus. The bonus could be an additional payout of credits, additional special credits, access to a secondary game, or some other bonus, such as a physical object. In some embodiments, the user is eligible if the player(s) in the user's hand match the favorite team and receive the player(s) high score for the set. In some embodiments that special score could be a random score or random week from that player's set of scores for that deck. In some embodiments, the user selects the favorite team prior to playing the game.

In some embodiments, the user could store information regarding a favorite team or favorite teams on his or her identification card or portable device. Using the identification card or portable device, the user could earn, store and retrieve special credits or other bonus information related to that star player or star players which could be communicated to the gaming device 10.

In some embodiments, the game is played without points for each player. In such embodiments, payouts are based solely on receiving season-best scores, season-worst scores, and matching various designations on the cards, for example rank, year (or season), team, or other elements of the player statistics or personal identification.

In certain embodiments, the user would play against a computer-controlled dealer or opponent. The winner would be determined based upon who had the better hand, the user or the dealer/opponent rather than matching against a pay table. In some embodiments, the game played against a computer-controlled opponent could be a secondary or bonus game.

In certain embodiments, the user would play against a real opponent or opponents via networked game devices. The winner would be determined based upon who had the better hand, the user or the opponent.

Game Decks

Game decks are created based upon the available pool of players. Typically, there are many more players than are needed to create a deck, so the creation of a deck can involve testing a potential deck by moving one or more players from the available pool to the deck and from the deck to the available pool in order to create the most appealing deck for game play. In games where scoring is an aspect of the wagering payouts, players for decks can be selected by operators based upon outcomes needed to meet specific probabilities and payout criteria.

Figure 8A:
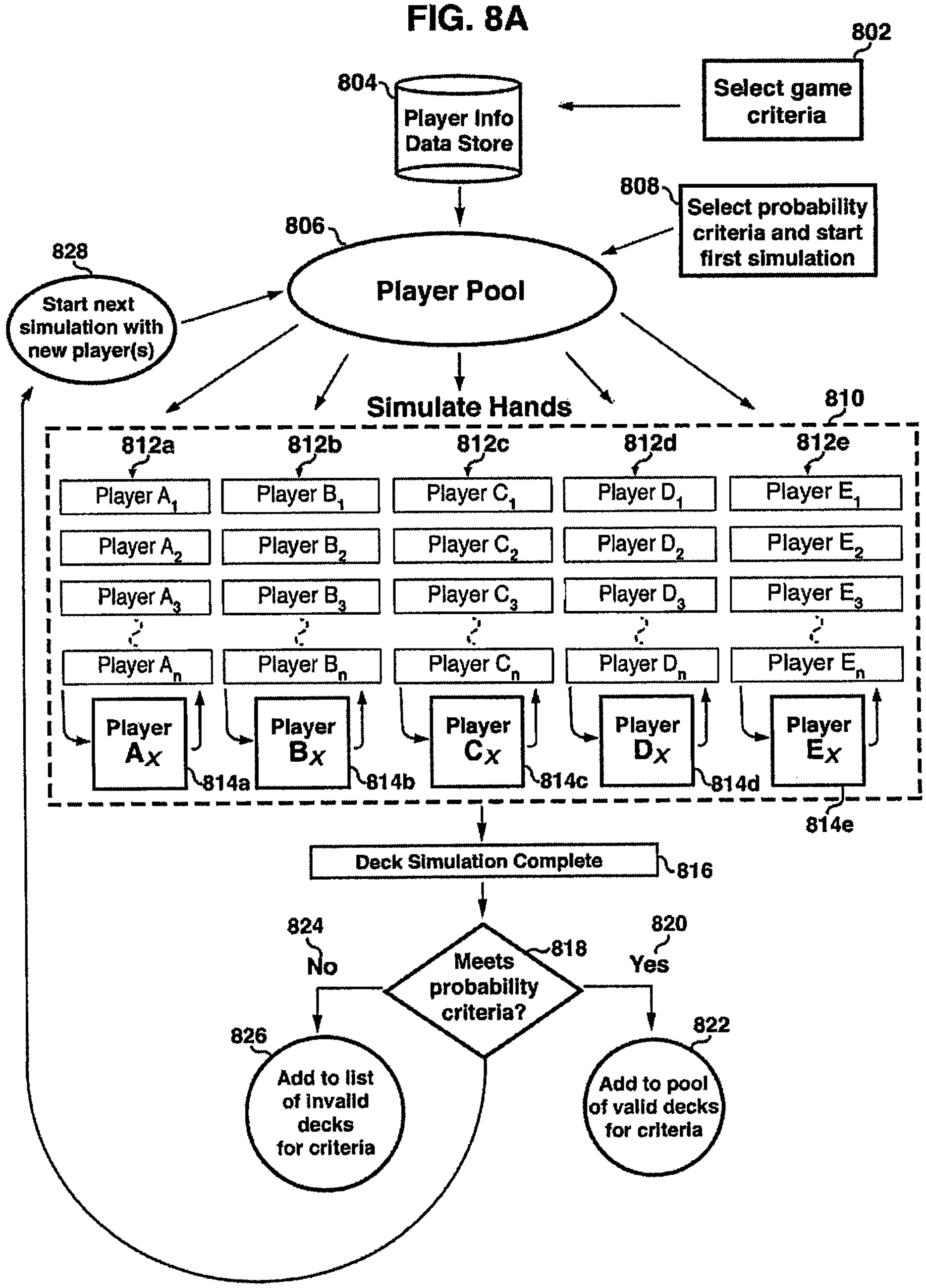

Turning now to FIG. 8*a*, in the example embodiment, the creation of a deck for game play starts with the selection of the criteria for the deck 802. One criterion might include the sport or sports for the players in the deck. For example, the deck could be composed solely of NFL football players or of Bundesliga soccer (association football) players, or it could be composed of players from multiple different sports leagues. Another criterion could be the time frame for the player statistics in the deck. For example, the time frame might be a partial season, a full season, multiple partial season, or multiple seasons. Another criterion could be only players of certain positions from a particular league. Once the criteria are selected, the appropriate group of player statistics is moved from the Player Information Data Store 804 to the Player Pool 806.

In the example embodiment, once the player pool has been created based on the game criteria, the probability criteria is selected 808. Probability criteria selection allows game device operators to set the probabilities and payouts for each game. In the context of this discussion an "operator" is any person who either makes decisions and/or implements decisions about the probabilities, payouts, entertainment value, speed of play, or any other game-play-related requirements. By testing and manipulating the players that will make up a deck, the operator can set probabilities and payouts to maximize the user's entertainment value while also maximizing profits.

For example, in certain embodiments setting the probabilities might include creating a deck where given every five player-card combinations in the deck, 20% of those combinations will have a total score equal to or greater than 100. In the same example, the operator might also want the same deck to also have an 8% probability that every five player-card combinations in the deck will have a total score equal to or greater than 110. In certain embodiments, the operator will set a range for the probabilities, for example if the desired probability is 20% of hands with a total score equal to or greater than 100, the operator could set the range to be within + or −0.5% of that probability (19.5% to 20.5%). In some embodiments, the operator does not set the range for the probabilities, the range is pre-set.

Starting with a large pool of players from which to create the sets needed to create a deck or multiple decks, the operator chooses the criteria to narrow the pool down to the proper size. The process begins by simulating a small percentage of all the potential hands in a given deck 810. Once the simulation for one potential deck is complete, the results are recorded and a new simulation begins with a different virtual deck created by removing at least one, but not limited to one, player from the previous deck and replacing that player with a different player from the Player Pool 806.

In the example embodiment, for the game simulation 810 the player information nodes 812*a-e*. The player information nodes in this example embodiment include information about the player. Referring now to FIG. 8B, the information contained in an individual player node is displayed. The player is identified by a player identification number 830. The player's scores 834 corresponds to ID numbers 832 that are used with the random number generator to create a test score. In the example embodiment, the player information nodes 812*a-e* are separated into five types A, B, C, D, and E in order to simulate the hands. In this example, the five types represent positions on a team. In some embodiments there could be 3, 4, 6, 7, 8 or some other number of types player information nodes. In some embodiments, the player information nodes are not separated into types.

When building the example deck, a certain number of cards of each type are required to fill out the deck. In the example embodiment, there are 12 players, represented by 12 virtual cards of each type. However, a deck could be created with any number of players per type. The simulation 810 calls a random group of player information nodes 814*a-e* and then calls a random number for each of the nodes. For each node, that random number is matched with the corresponding score ID number in the information on the player node 832. And the score 834 that corresponds to that ID number is found. The scores from all the current random group of nodes added up to get a total. These steps: calling the random group of player information nodes, then randomly finding an id number 832 that corresponds with a score 834 from among each of the player information node's set of scores, are run repeatedly to get a representative probability of outcomes for the deck. In some embodiments, the simulation need only run less than 0.0001 of 1 percent of the total number of potential hands in a deck to find a representative probability for the deck.

Once the simulation for the deck is complete 816, the representative probability or probabilities are checked to discover if they fall within the range of parameters of the probability criteria set for the game 818. If the answer is Yes 820, the deck (in this case meaning all the player information nodes that made up the most recent simulation) is recorded and placed in the pool of valid decks. If the answer is No 824, the deck is recorded as not valid for the given criteria 826. To get exact probabilities for those decks found to be valid in the simulation, a test is made running every possible outcome using the player information nodes from that deck 822 (as will be discussed further below).

In certain embodiments, after the probability parameters have been tested, a new simulation is prepared 828. At least one, but not limited to one, player information node is removed from the previous set used in the simulation and returned to the player pool, and a new player information node is added to that set to create a new unique deck for testing.

Figure 8C:
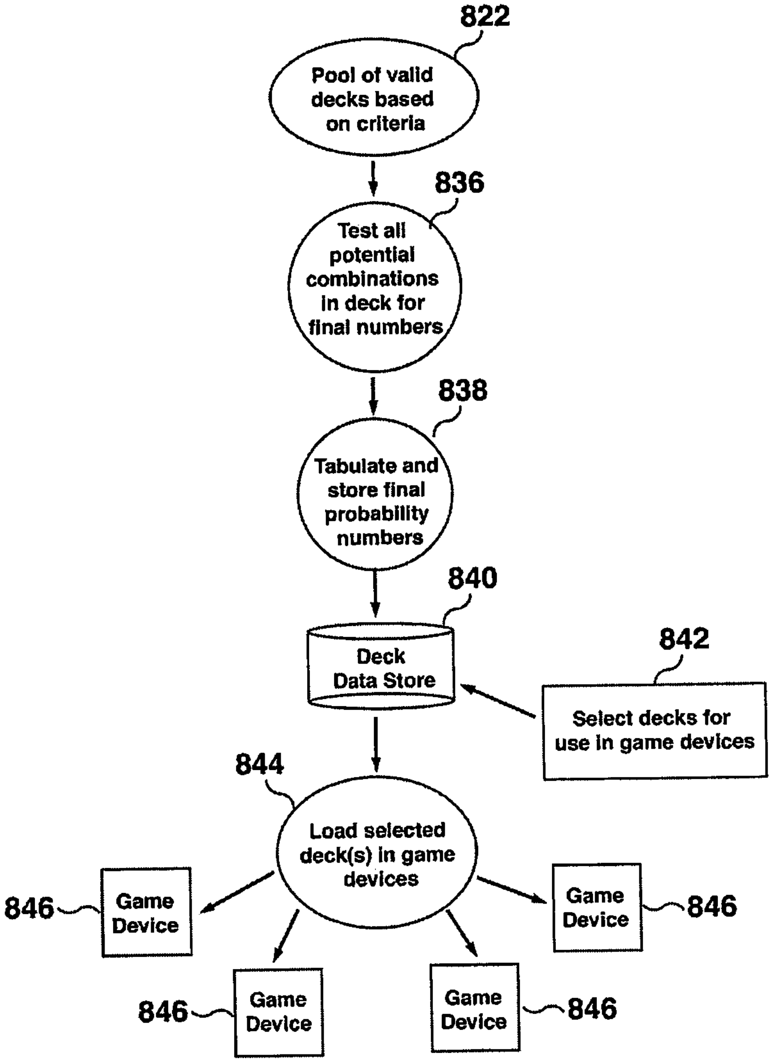

Turning to FIG. 8C, to get exact probabilities for decks found valid in the simulation 822, a test is made running every possible outcome of potential combinations using the player information nodes from the deck being tested 836. All final probability numbers are tabulated and stored 838 in the Deck Data Store 840. In addition, the final probabilities can also be stored and then used for reporting purposes for gaming authorities or for other purposes.

In some embodiments, an operator can review the decks in the Deck Data Store 840 and, based on desired game outcomes and payouts, select which decks will be used in a given game device or game devices 842. In certain embodiments, the information for the selected deck or decks 844 is loaded into the memory of the appropriate Game Devices 846. In certain embodiments, the deck information is loaded into a central server connected via network to the individual game devices.

Game Table

Figure 9A:
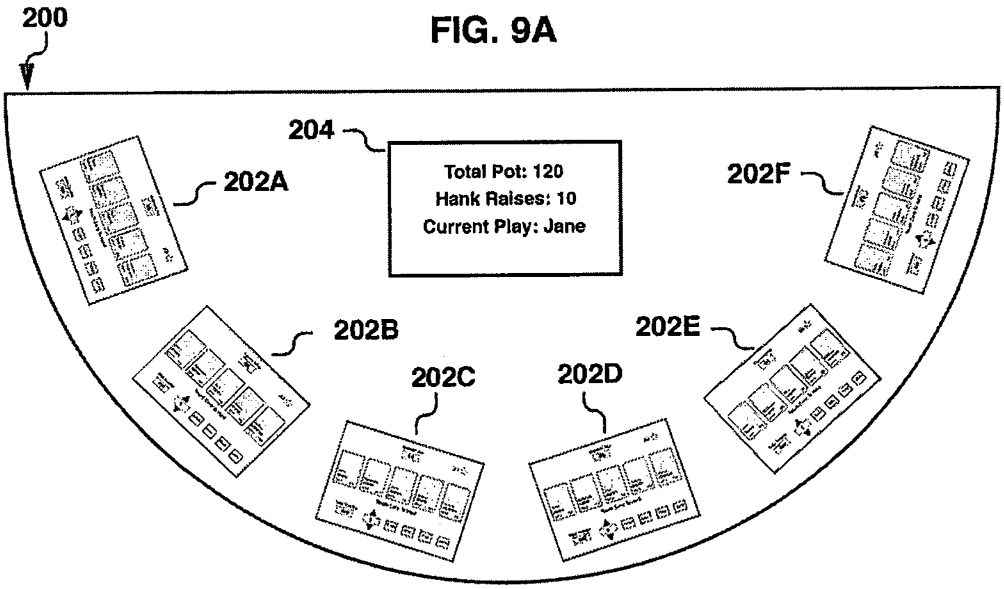
FIGS. 9A and 9B are illustrations of embodiments of electronic game tables set up for different versions of multi-user card games in the present disclosure.

FIG. 9A shows one example of a layout for a game table that is used in playing the multi-user version of the game.

In some embodiments, the game table 200 is a physical table equipped with a gaming surface in the form of an electronic display or multiple displays with a graphical user interface(s) representing users' play areas and community areas.

As shown in FIG. 9A, the game table may include a number of user areas 202A-F each associated with and seen only by an individual player and a community area that is seen by all players 204. As shown in FIG. 9A, the user areas 202A-F may be arranged around the table 200, with the community area 204 located at the center of the table. Each user has a screen that he or she can view at the table. FIG. 9A represents an embodiment of an electronic game table set to offer a multi-user 5-card version of the fantasy sports-based card game which will be described in greater detail below. The user screens 202A-F allow the user to see his or her cards, place wagers, and view information and messages related to the game being played.

Figure 9B:
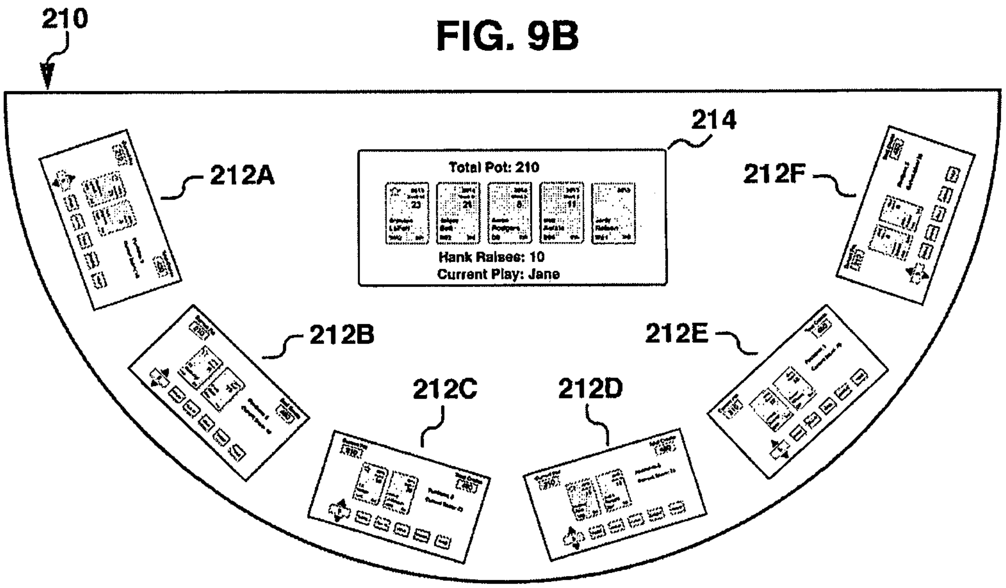

FIG. 9B shows a different example of a layout for a game table that is used in playing the multi-user card game. As shown in FIG. 9B, the game table may include a number of user areas 212A-F each associated with and seen only by an individual player and a community area that is seen by all players 214. As shown in FIG. 9B, the user areas 212A-F may be arranged around the table 200, with the community area 214 located at the center of the table. Each user has a screen that he or she can view at the table. FIG. 9B represents an embodiment of an electronic game table set to offer a multi-user "Hold Em" version of the fantasy sports-based card game which will be described in greater detail below. The user screens 212A-F allow the user to see his or her cards, place wagers, and view information and messages related to the game being played.

These are example embodiments of layouts for multi-user users of the fantasy sports-based card games described herein. As those skilled in the art will realize, various embodiments of the system described herein include a payment acceptor or acceptors that work in communication with the processor. A payment acceptor may include a coin slot and a payment, note, or bill acceptor, where the user inserts money, coins, tokens or other physical currency. In other embodiments, payment may be accepted by devices such as readers or validators for credit cards, debit cards or credit slips. In certain embodiments, a user may insert an identification card into a card reader of the gaming device. The card reader has the ability to read a magnetic strip or a programmed microchip on or within the identification card. In certain embodiments, the identification card is a card with a user's identification, credit totals and other related data. In other embodiments, a user may carry a portable device, such as a cell phone, a radio frequency identification tag or any other suitable wireless device, which communicates a user's identification, credit totals, and other related data to and from the gaming device. In certain embodiments, money may be transferred to a gaming device through electronic funds transfer from a suitable wireless device.

Betting may be completed via electronic touch screen or related betting buttons or may be made with physical chips or other physical currency with a live dealer or other operator in attendance.

In some embodiments the game table 200 is a virtual table that may be displayed to a player on a user device equipped with suitable interface(s) (e.g., an LCD display screen, a video screen, a tablet computer screen or other mobile device). In some embodiments the gaming table is a physical table with a dealer present to deal the cards (either physical or virtual) and take the players' wagers.

Multi-user Draw Style Game Play

An example of the operation of one embodiment of the card-based wagering game will be described. In this embodiment, the user is dealt 5 cards, however in other embodiments, it could be 3,4,6,7 or some other number of cards. In the example embodiment, the five cards represent 5 different player positions of an NFL football team. However, the cards could represent players any number of competitions, including but not limited to: American football, basketball, baseball, soccer (association football), ice hockey, cricket, auto racing, rugby, golf, tennis and could also include players from competitions involving animals (e.g., horse racing or dog racing). In certain embodiments there may be a plurality of different sports represented in a single deck.

In some embodiments of a multi-user game, each user is dealt a hand of cards that only he or she can see and that represents all the cards needed to make a hand for play. In some embodiments users can discard some cards and receive randomly selected cards to replace the ones the user has discarded.

Play is similar to the single player version of the game. However, rather than trying to reach a certain scoring level on a pay table, users are trying to reach the highest scoring level among all the users involved in the current hand. In some embodiments, scoring for multi-user games can be judged solely on the random points generated from each player's statistics. In some embodiments scoring can be based on a scoring table that ranks various possible hands and can include special player scores (such as that player's highest score for the set) and matching criteria (such as matching the same player season or rank for each card in a hand). In some embodiments bonus points are given for a pre-set criterion based on a player's statistics. One example would be if the randomly selected player score is that player's best score of that player's set of scores.

In some embodiments, the scoring is based on a multi-tier approach where the first level of scoring is the number of different player positions represented, and the second level is the total score from those player's fantasy points. In one non-limiting example, after the deal and all draws are completed, User #1's final hand might have 1 QB, 2 RB1s, 0 RB2s, 0 WR1s, and 2 WR2s, so that User #1 has 5 cards that represent 3 positions. User #2's final hand might have 1 QB, 1 RB1, 1 RB2, 0 WR1s, and 2 WR2s, so that User #1 has 5 cards that represent 4 positions. When the player card's random scores appear, User #1's hand has 101 total points, and User #2's hand has 92 total points. However, User #2 would be declared the winner of the hand because User #2 had 4 of the 5 positions filled while User #1 only had 3 of the positions filled.

In some multi-user embodiments, users take turns to bet on the current hand. A user can fold or make a bet, the next user can fold, can match the current bet, or raise the bet to a higher level. In some embodiments, if no bet is made, a user can "check", meaning they neither bet nor fold.

In some embodiments, once the highest hand has been decided the winning user wins the accumulated pot made up of the antes and the wagers made by all the users participating in the hand, minus some percentage held by the operator as payment for playing the game. In some embodiments the operator is paid up front by the users participating in the game at the table.

Figure 12A:
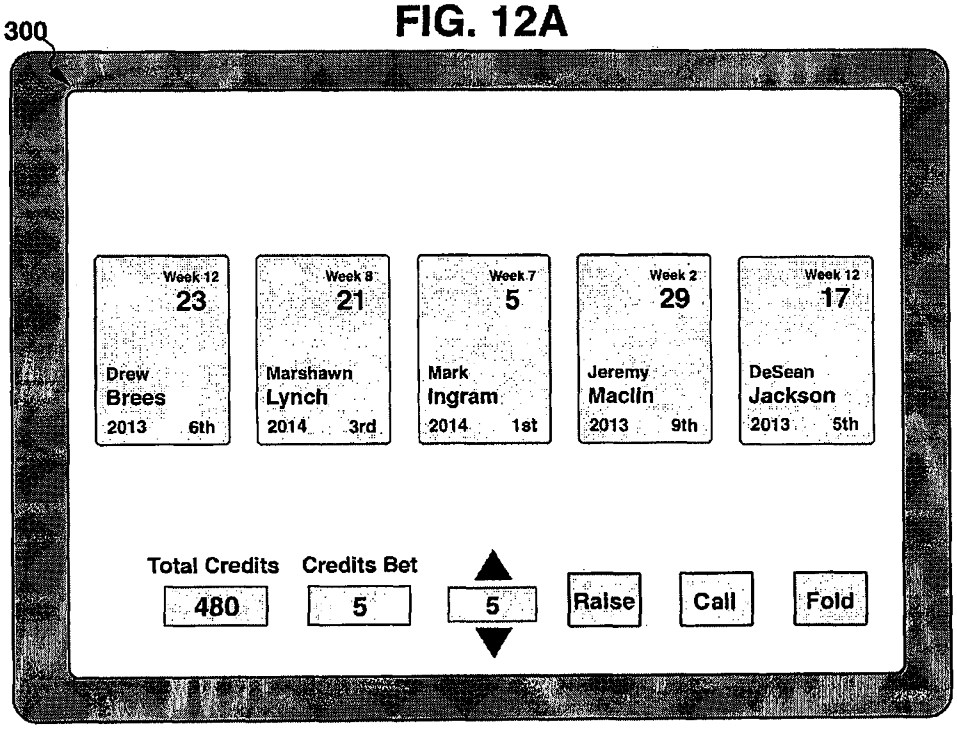
FIGS. 12A and 12B are illustrations of embodiments of mobile devices set up for different versions of multi-user card games in the present disclosure.

In some embodiments, as shown in a sample layout in FIG. 12A the multi-user game could be played on a tablet or other mobile device 300. It should be noted that this is one embodiment of a sample layout for a mobile device.

Multi-User "Hold Em-Style" Game Play

In some embodiments of a multi-user game, each user is dealt a set of randomly selected cards which are a subset of the number of cards needed to form a complete hand. This subset of cards, called "hole" cards, can only be seen by the particular user to which the cards were dealt. A set of "community cards" are then randomly selected and dealt. These cards can be seen by all the users and are used to complete each user's hand.

In the example embodiment shown in FIGS. 10A-G, each user is dealt two "hole" cards, meaning cards that only that user can see and only that user can play in the current hand, and then five more cards are dealt as "community" cards, meaning all users can see these cards and all users can use any or all of these cards to play in the current hand.

However, in other embodiments, it could be 1,3,4,5,6,7 or some other number of "hole" cards, and it could be 1,2,3, 4,6,7 or some other number of "community" cards.

The following text will refer to figures that will describe one embodiment of a "Hold Em" style of multi-user game play. FIG. 9B shows an embodiment of an electronic game table set for play of a multi-user "Hold Em" style game. The game table 210 includes areas for each individual user 212A-F to see his or her hand and a community area that all users can see 214.

To describe game play for a sample embodiment of a multi-user game, FIGS. 10A-G, one user area 212 and the community area 214 are represented side by side as various steps of the game are described. It should be noted that each user 212A-212F would see different cards and different scores on his or her user display area. Only one user area is shown in this example to simplify the description of game play.

In the example embodiment, the user display includes touchable buttons that allow the user to raise or lower the amount o 212 also includes a set of buttons that allow the user to raise or lower a wager 226, a Raise button that allows the user to place a wager above the current wager 228, an ALL IN button that allows the user to wager all his or her remaining funds 230, a Call button that allows the user to match the current wager 232, a Check button that allows the user to make no wager but stay in the hand if there is no current wager to match 234, and a Fold button that allows the user to leave the hand 236. Although all the buttons are shown on this example, every button would not necessarily need to be displayed during every stage of a hand. In addition, there is also a display bet display 238 showing how much the user has bet on the current hand. In some embodiments, buttons could be physical buttons. In some embodiments, the buttons could be a mixture of physical buttons and touchscreen buttons. In some embodiments, all of the buttons could be touchscreen buttons.

In this example embodiment, the user display 212 shows the backs of two cards 224A-B arranged for a hand. In the example embodiment, each user participating in the hand would receive two "hole" cards to begin the game.

In this example embodiment, on the community display 214, no cards have been dealt but users would see the total amount wagered 240. There has been a big blind bet of 20 and a small blind bet of 10. In this example, similar to games of "Hold Em" in poker, a small blind bet and a big blind bet, which are wagers two users in every hand are required to place before any cards are dealt, rotate around the table from hand to hand. However, it should be noted this is just one example of how wagering might start for a hand. In some embodiments there might be antes for every player. In some embodiments there might be no antes. In some embodiments there might be other forms of blind bets.

Figure 10A:
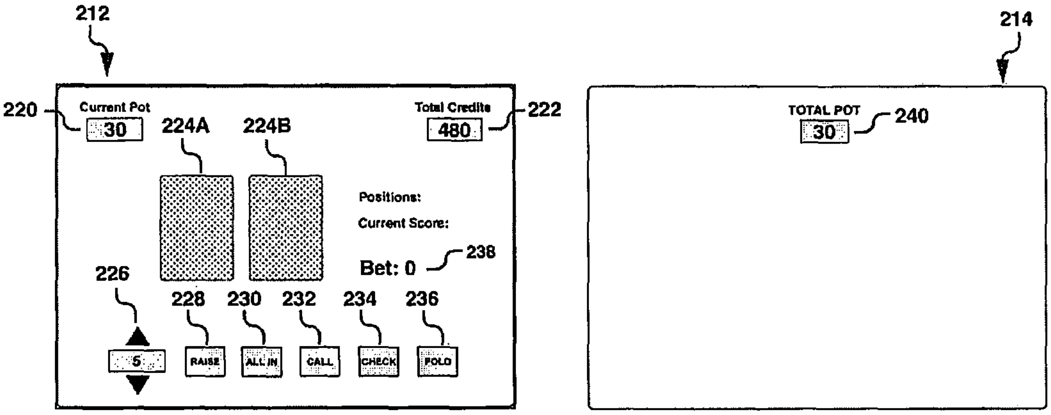
FIGS. 10A, 10B, 10C, 10D, 10E, 10F, and 10G are illustrations of embodiments of screen displays for a round of play of a multi-user card game in the present disclosure.
Figure 10B:
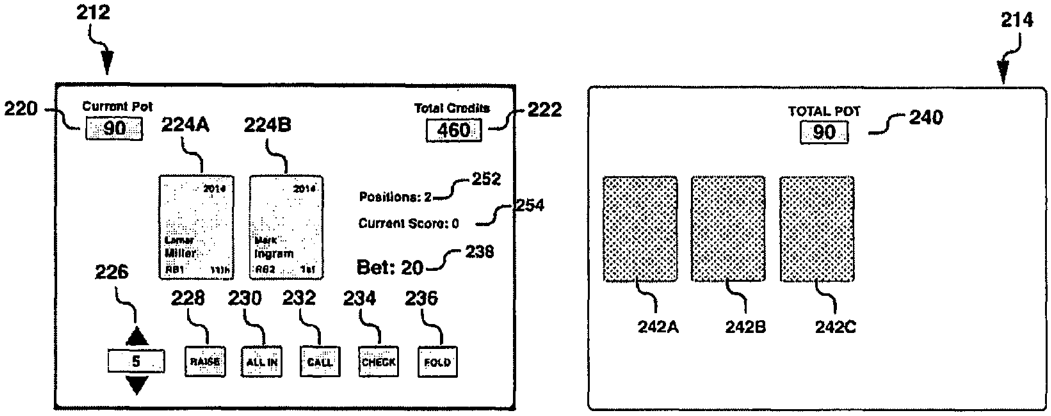
Figure 11:
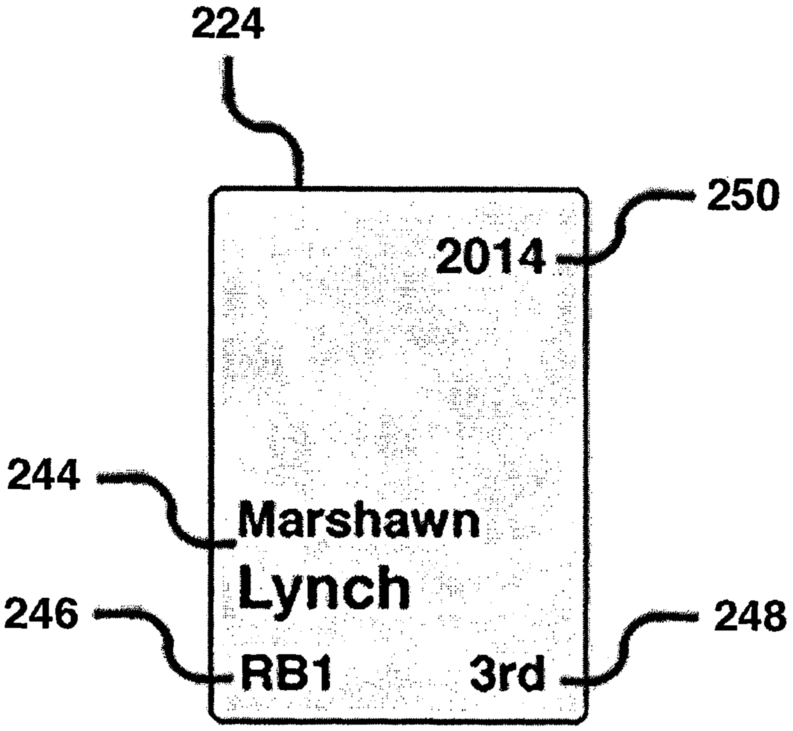
FIG. 11 is an illustration of embodiments of a card used for a round of play of the multi-user game in the present disclosure.

Once the hand has begun as represented in FIG. 10B, the user sees the cards 224A-B for the hand face up. In some embodiments the user can touch the card to choose if it is face up or face down. In addition, in this example, three cards 242A-C are dealt face down on the community display 214. Turning now to FIG. 11, the example card 224 displays the player's name 244, the player's position 246, the player's rank among all players assigned that position 248, and the year for the player's stats 250. Turning now to FIG. 10B, on the user display 212, as previously noted, the cards 224A and 224B are now face up. The Positions Number 252 is now set to 2. In the example embodiment, using NFL players for the fantasy sports cards, there are 5 positions: QB, RB1, RB2, WR1, and WR2.

The user in this example has received a RB1 and a RB2. In some embodiments, one of the elements of scoring is to determine how many of the positions available in a deck a user has in his or her hand. At the end of a hand, if a user has received players representing all five of the available positions, his or her hand will beat any hand that has fewer than all the available positions, regardless of how many points each user totaled at the end of the hand. A hand with one fewer of the total positions beats any hand with two fewer of the total positions, and so on. Thus, the Positions Number display 252 gives the user a running tally of how many positions have been filled in his or her hand. It should be noted that in some embodiments the number of positions needed to complete a hand could be some other number besides the 5 set forth in this example. It could be 2,3,4,6,7 or some other number of positions. In some embodiments if no user's hand reaches the number of positions needed to complete the total number of positions required, the hand is ended and no winner is declared. In some embodiments the pot wagered is then carried over to the next hand after no winner is declared, and no user wins the pot until a user's hand reaches the number of positions needed to complete a hand.

In some embodiments, between each round as new cards are revealed to the users, the users are allowed to wager. Wagering goes in turns around the table in a pre-determined method. Users are allowed to bet, call, raise, check, or fold their hands as it comes their turn to wager.

Figure 10C:
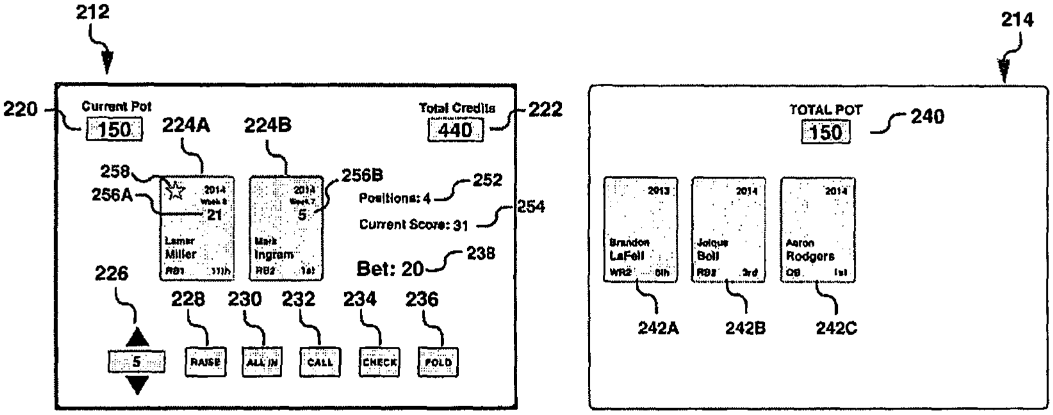

Turning now to FIG. 10C, the hand progresses. In this example, on the user's display 212 the user's cards reveal a randomly selected score from among each player's set of scores for that deck. In this example, the first card 224A has a score 256A of 21 and the second card 224B has a score 256B of 5. In addition, in this example, as part of the scoring display, the first card 224A has a star 258 indicating that the randomly selected score is that player's highest score of that player's set of scores. In this example, receiving that "special" score entitles the user to extra points. In this embodiment, the special score is based on having the player's highest score of the set. However, in other embodiments the special score could be based on a different criterion, such as the lowest score of the player's set or a randomly selected score from the player's set, or some other criterion. Also, the symbol representing the special score is a star for this example, but it could be some other symbol in other embodiments.

The number of extra points a user can earn for having a special score can be based on a pre-determined scoring table. One example would be 5 points for each special score. However, it could be any number of points for a special score. In some embodiments, the special scoring can increase as special scores are collected. For example, one special score in a hand might earn the user 5 additional points, the second additional score in the same hand might earn the user 10 additional points. As the number of special scores in a hand rises, the amount of additional points can rise as well. In some embodiments, the amount of points earned for a special score could be randomly selected. In this example the user earns 5 additional points for having the special score. As indicated by the Current Score display 254, the user has 31 points in this example. The user received 21 points 256A from card 224A, 5 points 256B from card 224B, plus 5 points for the high score star 258 on card 224A.

Turning to the community display 214, in this embodiment when the user's two cards have their scores revealed, three cards are dealt out as community cards 242A-C. In some embodiments there could be wagering before the flop dealt. In some embodiments more cards could be dealt for the flop and in some embodiments fewer cards could be dealt for the flop. In this example three cards are dealt as the flop and the positions for the player cards are WR2 242A, RB2 242B, and QB 242C. In this example, the user already has a player with the designated position of RB2 224B, but the positions of WR2 and QB add two more positions to the user's total number of player positions bringing that number to 4, as indicated in the Positions Display 252. All the users currently playing in this example hand would see their players' scores and if any of their players had a special score. There would then be another round of wagering.

Figure 10D:
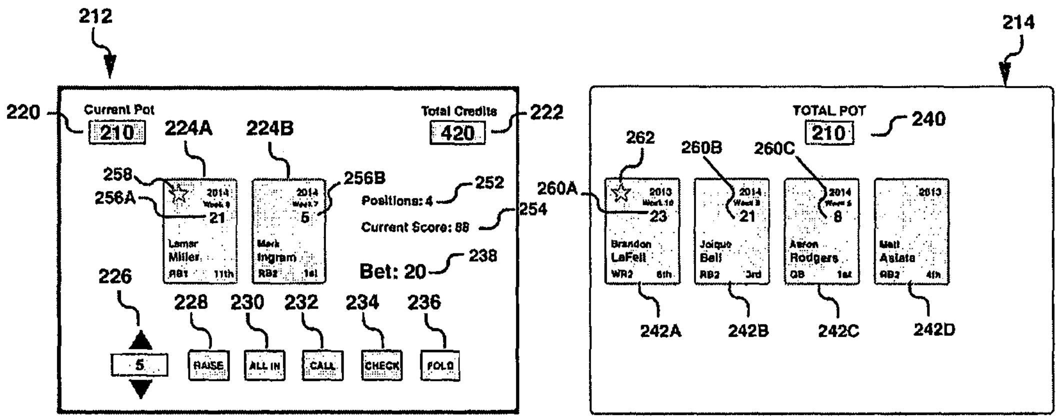

Turning now to FIG. 10D, on the community display 214 the player scores 260A-C for the first three community cards 242A-C have now been randomly selected and revealed. In addition, one of the community cards 242A includes a star 262 representing a special score. All the users still remaining in this hand can use the community cards to make their hand for scoring purposes. In this example, the user display 212 for the example user shows that the user now has 88 points as indicated by the Current Score display 254. In this example this number is arrived at by adding the score on user's first card 256A, and the scores on the three community cards 260A, 260B, and 260C. In this embodiment, since this user has two cards 256B and 260B with the position RB2, the higher score of the two, 21 points from Community Card 260B, is automatically taken for the user's score. In some embodiments the user would indicate which of the cards he or she would want to use. In addition, in this example, there is a special score in the first community card 242A represented by a star 262. Since the user has one special score already in the hole cards 224A represented by a star 258, the special score among the community cards counts as that user's second special score, so in this example scoring version, the user receives an additional 10 points.

Returning to the community display 214 another community card 242D has been dealt. In this example it is the fourth of the community cards. In this example the player's position is an RB2, so on the user display 212, the Positions display 252 remains at 4.

In this example, users would again have a round of betting following the reveal of the latest community card.

Figure 10E:
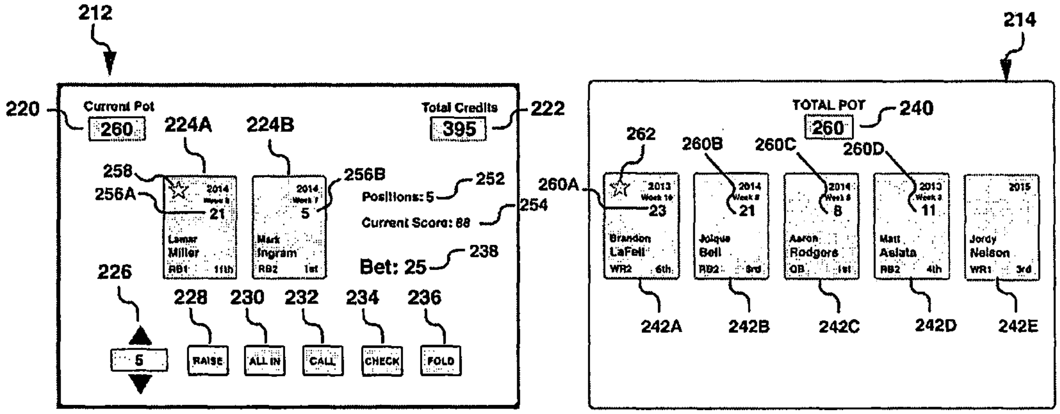

Turning now to FIG. 10E, on the community display 214 the player score 260D for community card 242D has now been randomly selected and displayed. However, for this user in this example, on the user display 212 the Current Score display 254 shows the score remaining at 88 points, because this user has a better score with a different card with a player with the position RB2. (Card 242B score 260B is higher than card 242D score 260D.) Also, as shown on the community display 214 the fifth and final card 242E for this example hand has been dealt. The player position for that card is a WR1, so turning back to the user display 212, the Positions display 252 now shows the user has 5 positions filled, and therefore, for this example, has all the player positions filled.

In this example, users would again have a round of betting following the reveal of the latest community card.

Figure 10F:
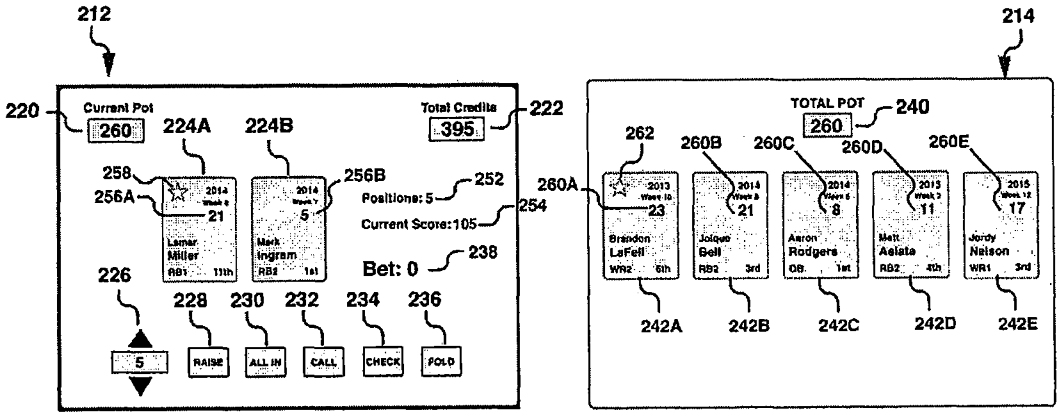

Turning now to FIG. 10F, on the community display 214 the player score 260E for community card 242E has now been randomly selected and displayed, in this example, the randomly selected player score 260E is 17. In turn, for this example, on the user display 212 the Current Score display 254 shows the score is now 105 points.

In this example, once the final community card's score is randomly selected and revealed, those users that have remained in the hand can make a final wager. Then each user who is still in the hand reveals their cards and a winner is declared.

Figure 10G:
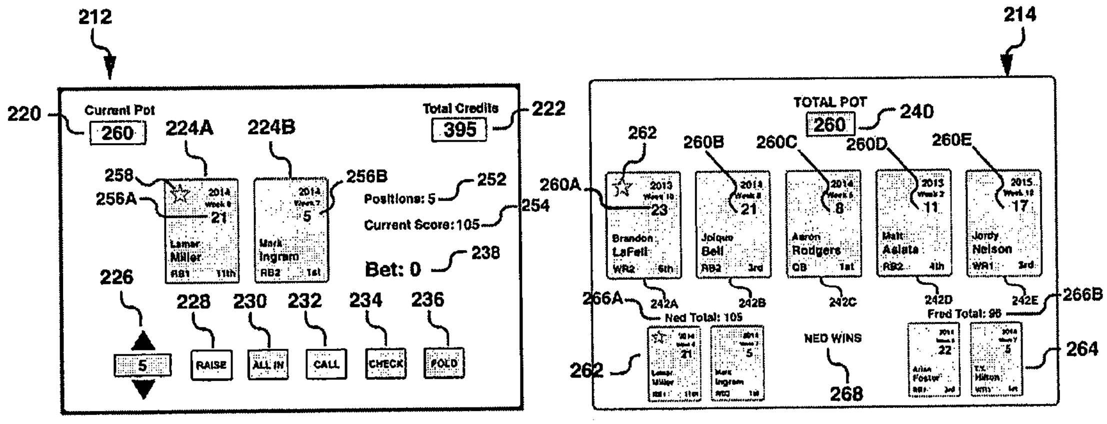

Turning now to FIG. 10G, on the community display 214 in this example, the remaining users hole cards are displayed 262 and 264, and a winner is declared 266. The winner receives the pot. In some embodiments a percentage of the pot is paid to the operator. In some embodiments the operator is paid up front by the users participating in the game at the table.

As those skilled in the art will realize, various embodiments of the system described herein include, but are not limited to, an arrangement wherein graphics are stored on a client device, whether pushed from a server via a download or invoked via a locally stored application. Additionally, the client device includes a processor and associated communication interface for generating, sending, and receiving specific commands and messages associated with gameplay described herein, such as fold, bet, and card selection commands, among others.

Figure 12B:
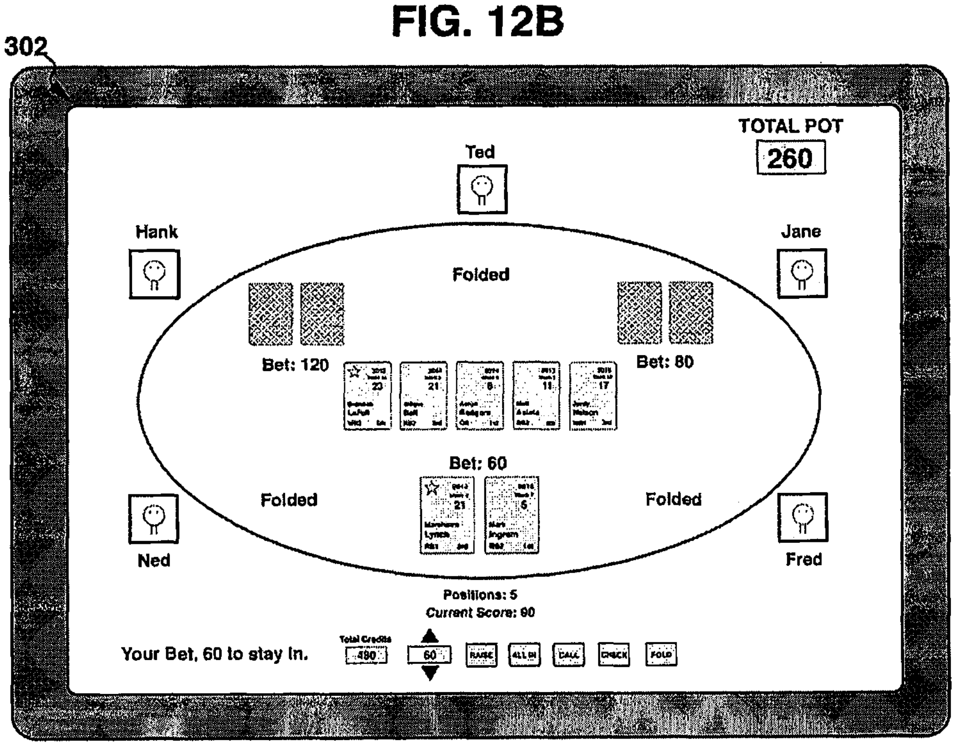

In some embodiments, as shown in sample layouts in FIG. 12B the multi-user game could be played on a tablet or other mobile device 302. It should be noted that this is one embodiment of a sample layout for a mobile device.

Representative Embodiments of the Invention

1. A gaming machine generally dedicated to playing a card-based wagering game comprising: a housing; an electronic display device disposed on the housing; a plurality of electronic input devices disposed on the housing, the electronic input devices configured to receive a physical or wireless input and transform the input into an electronic data signal and wherein at least one of the electronic input devices is a wager-input device; at least one memory device disposed on the housing; at least one electronic processing device disposed on the housing, configured to operate with at least one memory device, the display device and the electronic input devices to: for a single play of a card-based game: (a) randomly select, via the electronic processing device, a hand of a designated quantity of cards from a virtual deck of cards, the virtual cards in the deck composed of identifying information and statistics related to players and player's actions in real-life sporting events, (b) display, via the display device, the randomly selected cards face-up, (c) enable a user to select, via at least one of the input devices, which, if any, of the displayed cards to keep for the current hand, (d) discard, via the electronic processing device, any displayed cards not kept for the current hand, (e) complete the hand by, for each of any discarded cards of the hand, randomly selecting, via the electronic processing device, one of the cards remaining in the virtual deck of cards, and displaying, via the display device, that randomly selected card in place of any of the discarded cards, (f) randomly select, via the electronic processing device, a statistic or statistics from among the statistics related to the players' outcomes in real-life sporting events, (g) evaluate, via the electronic processing device, the completed hand for any of a plurality of different winning card combinations of a pay table, which may include winning values, bonus values and/or jackpot values, and (h) display, via the display device, any awards associated with any winning card combinations formed by the completed hand.

2. The gaming machine of embodiment 1, wherein a randomly selected statistic is a pre-determined score.

3. The gaming machine of embodiment 2, wherein a plurality of the randomly selected, pre-determined scores are added to obtain a sum for a total score.

4. The gaming machine of embodiment 3, wherein the total score is evaluated, via the electronic processing device, for a total that meets the criteria of a winning score of a pay table.

5. The gaming machine of embodiment 4, wherein the display device displays an award associated with a winning score.

6. The gaming machine of embodiment 2, wherein a randomly selected statistic is recognized as an exceptional score.

7. The gaming machine of embodiment 6, wherein the statistic recognized as an exceptional score is evaluated, via the electronic processing device, to determine if it meets the winning criteria of a pay table.

8. The gaming machine of embodiment 7, wherein the display device displays an award associated with the winning criteria.

9. The gaming machine of embodiment 6, wherein multiple cards' randomly selected statistics are recognized as exceptional scores.

10. The gaming machine of embodiment 9, wherein the multiple statistics recognized as exceptional scores are evaluated, via the electronic processing device, to determine if they meet the winning criteria of a pay table.

11. The gaming machine of embodiment 10, wherein the display device displays an award associated with the winning criteria.

12. The gaming machine of embodiment 6, wherein the exceptional score is the player's highest score.

13. The gaming machine of embodiment 6, wherein the exceptional score is the player's lowest score.

14. The gaming machine of embodiment 6, wherein the exceptional score is a pre-determined score but neither the highest nor lowest.

15. The gaming machine of embodiment 6, wherein the exceptional score is randomly selected during the play of the hand.

16. The gaming machine of embodiment 6, wherein the exceptional score, via the electronic processing device, triggers a system that records the number of exceptional scores the user has earned over multiple plays of the card-based game.

17. The gaming machine of embodiment 16, wherein the display device displays the recording of the exceptional score by the reward system.

18. The gaming machine of embodiment 16, wherein the number of exceptional scores the reward system has recorded are evaluated, via the electronic processing device, to determine if they meet the winning criteria of a pay table.

19. The gaming machine of embodiment 16, wherein the display device displays an award associated with the winning criteria.

20. The gaming machine of embodiment 1, wherein the display device displays an element of identifying information related to a real-life player on that player's virtual card.

21. The gaming machine of embodiment 20, wherein a plurality of the real-life players' identifying information is evaluated, via the electronic processing device, to determine if the correspondence among the identifying information meets the criteria of a pay table.

22. The gaming machine of embodiment 21, wherein the display device displays an award associated with the winning criteria.

23. The gaming machine of embodiment 1, wherein the display device displays a plurality of elements of identifying information related to a real-life player on a virtual card.

24. The gaming machine of embodiment 23, wherein a plurality of the real-life players' identifying information is evaluated, via the electronic processing device, to determine if the correspondence among the identifying information meets the criteria of a pay table.

25. The gaming machine of embodiment 24, wherein the display device displays an award associated with the winning criteria.

26. The gaming machine of embodiment 23, wherein a randomly selected statistic is a pre-determined score.

27. The gaming machine of embodiment 26, wherein a plurality of the randomly selected, pre-determined scores are added to obtain a sum for a total score.

28. The gaming machine of embodiment 27, wherein the total score is evaluated and wherein a plurality of the real-life players' identifying information is evaluated, via the electronic processing device, to determine if the correspondence among the identifying information along with the total score meets the criteria of a pay table.

28. The gaming machine of embodiment 27, wherein the display device displays an award associated with the winning criteria.

29. The gaming machine of embodiment 6, wherein the user can select a player represented in the virtual deck and designate that player as a special player for one or a plurality of hands of the game.

30. The gaming machine of embodiment 29, wherein it is determined, via the electronic processing device, that the user's current hand includes a special player.

31. The gaming machine of embodiment 30, wherein a statistic recognized as an exceptional score is evaluated, via the electronic processing device, to determine if it meets the winning criteria of a pay table.

32. The gaming machine of embodiment 6, wherein a player's team is among the players' identifying information in the virtual deck 33. The gaming machine of embodiment 32, wherein the user can select a team represented in one player's or a plurality of players' identifying information in the virtual deck and designate that team as a special team for one or a plurality of hands of the game.

34. The gaming machine of embodiment 33, wherein it is determined, via the electronic processing device, that the user's current hand includes a player or players who are identified as members of the special team.

35. The gaming machine of embodiment 34, wherein a statistic recognized as an exceptional score is evaluated, via the electronic processing device, to determine if it meets the winning criteria of a pay table.

36. The gaming machine of embodiment 1, wherein one of the electronic input devices is a card reader.

37. The gaming machine of embodiment 1, wherein one of the electronic input devices is a wireless receiver.

38. The gaming machine of embodiment 36, wherein the user can store, via the card reader and a user identification card, one or a plurality of exceptional scores the reward system has recorded for the user.

39. The gaming machine of embodiment 36, wherein the user can store, via the card reader and a user identification card, one or a plurality of special players the user has chosen for game play.

40. The gaming machine of embodiment 36, wherein the user can store, via the card reader and a user identification card, one or a plurality of special teams the user has chosen for game play.

41. The gaming machine of embodiment 37, wherein the user can store, via the wireless receiver and a user's smart phone, radio frequency identification tag or other suitable wireless device, one or a plurality of exceptional scores the reward system has recorded for the user.

42. The gaming machine of embodiment 37, wherein the user can store, via the wireless receiver and a user's smart phone, radio frequency identification tag or other suitable wireless device, one or a plurality of special players the user has chosen for game play.

43. The gaming machine of embodiment 37, wherein the user can store, via the wireless receiver and a user's smart phone, radio frequency identification tag or other suitable wireless device, one or a plurality of special teams the user has chosen for game play.

44. The gaming machine of embodiment 1, wherein a jackpot value is set by an electronic processing device.

45. The gaming machine of embodiment 44, wherein the jackpot value is displayed by the display device.

46. The gaming machine of embodiment 44, wherein the jackpot value increases over time.

47. The gaming machine of embodiment 46, wherein the jackpot value is displayed by the display device.

48. The gaming machine of embodiment 1, wherein there are multiple virtual decks and one is selected, via the electronic processing device, prior to the beginning of a hand.

49. The gaming machine of embodiment 1, wherein there are multiple virtual decks and one is selected, via the electronic processing device, based on the user's choice of special player.

50. The gaming machine of embodiment 1, wherein there are multiple virtual decks and one is selected, via the electronic processing device, based on the user's choice of special team.

51. The gaming machine of embodiment 1, wherein the machine is networked among a plurality of other gaming machines.

52. A method of creating virtual decks for a fantasy-sports based card game wherein there is a pool of potential real-life players greater than the number required to form the virtual deck and the potential players are selected from the pool based upon the desired outcomes for the pay table, including any bonus values and jackpot values.

53. A gaming system comprising: an electronic processing device; and a memory device that stores a plurality of instructions that, when executed by the electronic processing device, cause the electronic processing device to: for a single play of a card-based game: (a) randomly select, via the electronic processing device, a hand of a designated quantity of cards from a virtual deck of cards, the virtual cards in the deck composed of identifying information and statistics related to players in real-life sporting events, (b) communicate display data to a mobile device which then displays the randomly selected cards face-up, (c) enable a user to select, via at least one of the input devices, which, if any, of the displayed cards to keep for the current hand, (d) discard, via the electronic processing device, any displayed cards not kept for the current hand, (e) complete the hand by, for each of any discarded cards of the hand, randomly selecting, via the electronic processing device, one of the cards remaining in the virtual deck of cards and communicate display data to a mobile device which then displays that randomly selected card in place of any of the discarded cards, (f) randomly select, via the electronic processing device, a statistic or statistics from among the statistics related to the players' actions in real-life sporting events, (g) evaluate, via the electronic processing device, the completed hand for any of a plurality of different winning card combinations of a pay table, which may include winning values, bonus values and/or jackpot values, and (h) communicate display data to a mobile device which then displays any awards associated with any winning card combinations formed by the completed hand.

54. A gaming system comprising: an electronic processing device; and a memory device that stores a plurality of instructions that, when executed by the electronic processing device, cause the electronic processing device to: for a single play of a card-based game: (a) randomly select, via the electronic processing device, a hand of a designated quantity of cards from a virtual deck of cards, the virtual cards in the deck composed of identifying information and statistics related to players in real-life sporting events, (b) communicate display data to a computing device which then displays the randomly selected cards face-up, (c) enable a user to select, via at least one of the input devices, which, if any, of the displayed cards to keep for the current hand, (d) discard, via the electronic processing device, any displayed cards not kept for the current hand, (e) complete the hand by, for each of any discarded cards of the hand, randomly selecting, via the electronic processing device, one of the cards remaining in the virtual deck of cards and communicate display data to a computing device which then displays that randomly selected card in place of any of the discarded cards, (f) randomly select, via the electronic processing device, a statistic or statistics from among the statistics related to the players' actions in real-life sporting events, (g) evaluate, via the electronic processing device, the completed hand for any of a plurality of different winning card combinations of a pay table, which may include winning values, bonus values and/or jackpot values, and (h) communicate display data to a computing device which then displays any awards associated with any winning card combinations formed by the completed hand.

55. An electronic gaming table that is designed to host a plurality of users and comprising at least one electronic processor, at least one electronic memory, at least one electronic input device, and at least one electronic display which serves as a gaming surface and a table surface; the electronic memory, the input device, and the display being operatively connected to the processor(s), the memory storing computer readable instructions for the processor(s) which when executed by the processor(s) cause the gaming table to perform a method for playing a card game, the method comprising the steps of: after receiving, via the input device, an ante bet input from at least one of the users, for a single play of a card-based game: (a) randomly select, via the electronic processing device, a hand of a designated quantity of cards from a virtual deck of cards, the virtual cards in the deck composed of identifying information and statistics related to players in real-life sporting events, (b) display, via the display device, the randomly selected cards face-up, (c) enable via the input device, the users to place a bet or to fold and exit the hand (d) enable each user to select, via at least one of the input devices, which, if any, of the displayed cards to keep for the current hand, (e) discard, via the electronic processing device, any displayed cards not kept for the current hand, (0 complete the hand by, for each of any discarded cards of the hand, randomly selecting, via the electronic processing device, one of the cards remaining in the virtual deck of cards, and displaying, via the display device, that randomly selected card in place of any of the discarded cards, (g) enable via the input device, the users to place a bet or to fold and exit the hand (h) randomly select, via the electronic processing device, a statistic or statistics from among the statistics related to the players' actions in real-life sporting events, (i) evaluate, via the electronic processing device, the completed hand of each user and determine the user with the winning total, which may include winning values, bonus values and/or jackpot values, and (j) display, via the display device, any awards and payout values associated with any winning card combinations formed by the completed hands.

56. The gaming machine of embodiment 55, wherein the display device displays a plurality of elements of identifying information related to a real-life player on a virtual card.

57. The gaming machine of embodiment 56, wherein a plurality of the real-life players' identifying information is evaluated, via the electronic processing device, to determine if the correspondence among the identifying information meets the criteria of a bonus points table.

58. The gaming machine of embodiment 57, wherein the display device displays an award associated with the winning criteria.

59. The gaming machine of embodiment 55, wherein no ante is required to start a hand.

60. The gaming machine of embodiment 55, wherein after receiving, via the input device, a bet input from at least one of the users, for a single play of a card-based game: (a) randomly select, via the electronic processing device, a hand of a designated quantity of cards from a virtual deck of cards, the virtual cards in the deck composed of identifying information and statistics related to players in real-life sporting events, (b) display, via the display device, the randomly selected cards, designated as "hole cards", face-up to each user, (c) enable via the input device, the users to place a bet or to fold and exit the hand, (d) randomly select, via the electronic processing device, a designated quantity of cards from the cards remaining in the virtual deck of cards, to be dealt as "community cards", (e) display, via the display device, the community cards where they can be seen by all users, (f) enable via the input device, the users to place a bet or to fold and exit the hand, (g) randomly select, via the electronic processing device, a statistic or statistics from among the statistics related to the players' actions in real-life sporting events, (h) display, via the display device, the randomly selected scores on the corresponding virtual cards among the users' "hole cards", (i) display, via the display device, the randomly selected scores on the corresponding virtual cards among the "community cards", (j) evaluate, via the electronic processing device, the completed hand of each user and determine the user with the winning total, which may include winning values, bonus values and/or jackpot values, and (k) display, via the display device, any awards and payout values associated with any winning card combinations formed by the completed hands.

61. The gaming machine of embodiment 60, wherein the display, via the display device, of the randomly selected scores on the corresponding virtual cards among the users' "hole cards", is displayed in tandem with the display, via the display device, of some number of the community cards, without display of the scores for those "community cards".

62. The gaming machine of embodiment 60, wherein the display, via the display device, of the randomly selected scores on the corresponding virtual cards of some number of the "community cards," is displayed in tandem with the display, via the display device, of some number of additional "community cards", without display of the scores for those additional "community cards".

63. The gaming machine of embodiment 60, wherein the users are able via the input device, to place a bet or to fold and exit the hand, between each event of some number of new cards being randomly determined and displayed via the display device.

64. The gaming machine of embodiment 60, wherein the users are able via the input device, to place a bet or to fold and exit the hand, between each event of some number of new scores being randomly determined and displayed via the display device.

65. The gaming machine of embodiment 60, wherein a randomly selected statistic is a pre-determined score.

66. The gaming machine of embodiment 65, wherein a plurality of the randomly selected, pre-determined scores are added to obtain a sum for a total score.

67. The gaming machine of embodiment 66, wherein the total score of each user is evaluated, via the electronic processing device, to determine the highest total.

68. The gaming machine of embodiment 67, wherein the display device displays an award associated with the highest total.

69. The gaming machine of embodiment 65, wherein a randomly selected statistic is recognized as an exceptional score.

70. The gaming machine of embodiment 69, wherein the statistic recognized as an exceptional score is evaluated, via the electronic processing device, to determine if it meets the criteria for an additional score and if so is added to the user's total score.

71. The gaming machine of embodiment 70, wherein the display device displays an award associated with the winning criteria.

72. The gaming machine of embodiment 69, wherein multiple cards' randomly selected statistics are recognized as exceptional scores.

73. The gaming machine of embodiment 72, wherein the multiple statistics recognized as exceptional scores are evaluated, via the electronic processing device, to determine if it meets the criteria for an additional score and if so is added to the user's total score.

74. The gaming machine of embodiment 69, wherein the display device displays an award associated with the winning criteria.

75. The gaming machine of embodiment 69, wherein the exceptional score is the player's highest score.

76. The gaming machine of embodiment 69, wherein the exceptional score is the player's lowest score.

77. The gaming machine of embodiment 69, wherein the exceptional score is a pre-determined score but neither the highest nor lowest.

78. The gaming machine of embodiment 69, wherein the exceptional score is randomly selected during the play of the hand.

79. The gaming machine of embodiment 60, wherein the display device displays an element of identifying information related to a real-life player on that player's virtual card.

80. The gaming machine of embodiment 79, wherein a plurality of the real-life players' identifying information is evaluated, via the electronic processing device, to determine if the correspondence among the identifying information meets the criteria of a bonus points table.

81. The gaming machine of embodiment 80, wherein the display device displays an award associated with the winning criteria.

82. The gaming machine of embodiment 60, wherein the display device displays a plurality of elements of identifying information related to a real-life player on a virtual card.

83. The gaming machine of embodiment 82, wherein a plurality of the real-life players' identifying information is evaluated, via the electronic processing device, to determine if the correspondence among the identifying information meets the criteria of a bonus points table.

84. The gaming machine of embodiment 83, wherein the display device displays an award associated with the winning criteria.

85. The gaming machine of embodiment 55, wherein among the real-life players' identifying information is the position that player plays in the real-life events in which the player participates.

86. The gaming machine of embodiment 55, wherein winning hands are determined based on if the hand in question meets the criteria for the pre-determined suitable number of "positions" being met among all the players represented on the user's virtual cards 87. The gaming machine of embodiment 55, wherein there are multiple virtual decks and one is selected, via the electronic processing device, prior to the beginning of a hand.

88. The gaming machine of embodiment 55, wherein the machine is networked among a plurality of other gaming machines.

89. The gaming machine of embodiment 55, wherein the game is played via a network among a plurality of mobile devices.

90. The gaming machine of embodiment 60, wherein there are multiple virtual decks and one is randomly selected, via the electronic processing device, prior to the beginning of a hand.

91. The gaming machine of embodiment 60, wherein the machine is networked among a plurality of other gaming machines.

92. The gaming machine of embodiment 60, wherein the game is played via a network among a plurality of mobile devices.

93. The gaming machine of embodiment 60, wherein among the real-life players' identifying information is the position that player plays in the real-life events in which the player participates.

94. The gaming machine of embodiment 60, wherein winning hands are determined based on if the hand in question meets the criteria for the pre-determined suitable number of "positions categories" being met among all the players represented on the user's virtual cards.

95. An electronic gaming table configured to accommodate a plurality of users, the table comprising: at least one electronic processor; at least one electronic memory; at least one electronic player input device; and at least one electronic display, wherein the electronic display serves as a gaming surface and a table surface, and wherein the electronic memory, the input device, and the display are operatively connected to the processor, and wherein the memory stores computer readable instructions for the processor that, when executed, cause the processor to: (a) provide a virtual deck of cards, wherein the virtual cards in the deck have been selected from a virtual pool of cards, the cards in the pool being divided into five different player position categories and the deck comprising 12 virtual cards from each of the five player position categories, wherein the virtual cards comprise identifying information and real-life statistics related to player's actions in real-life sporting events, and wherein the cards in the deck have been selected from the pool of cards such that the probability of the cards in the deck generating a winning total based on the real-life statistics of the selected cards in the deck is maintained within a pre-determined range; (b) randomly select a hand of a designated quantity of cards from the virtual deck of cards; (c) display, via the display device, the randomly selected cards face-up; (d) enable the users, via an input device, to place a bet or to fold and exit the hand; (e) enable each user to select, via an input device, which, if any, of the displayed cards to keep for the current hand; (0 discard any cards not selected by the user to be kept for the current hand; (g) complete the hand by, for each of any discarded cards of the hand, randomly selecting one of the cards remaining in the virtual deck of cards, and displaying, via the display device, that randomly selected card in place of any of the discarded cards; (h) enable the users, via an input device, to place a bet or to fold and exit the hand; (i) randomly select a statistic from among the real-life statistics related to player's actions in real-life sporting events for each card in the user's hand and display the selected statistic on the card as a score; (j) evaluate the completed hand of each user and determine a winning user based on a winning total; and (k) display, via the display device, any awards or payout values associated with any winning card combinations or a winning total formed by the completed hands.

96. The gaming table of embodiment 95, wherein the virtual cards identify players in the National Football League.

97. The gaming table of embodiment 96, wherein the real-life statistics on the virtual cards are from a single playing season.

98. The gaming table of embodiment 96, wherein the real-life statistics on the virtual cards are from multiple playing seasons.

99. The gaming table of embodiment 95, wherein the winning total is based on the sum of the scores on the cards in a user's hand and pre-determined values assigned to individual cards or card combinations.

100. The gaming table of embodiment 95, wherein one of the real-life statistics for each virtual card is designated as special and wherein the winning total is based in part of the number of special scores in a user's hand.

101. The gaming table of embodiment 95, wherein the winning total is based in part of the combination of player position categories on the cards in a user's hand.

102. A gaming machine for playing a card-based wagering game, the machine comprising: a housing; an electronic display device disposed on the housing; an electronic input device disposed on the housing, wherein the electronic input device is configured to receive a physical or wireless input, at least one memory device disposed on the housing; at least one electronic processing device disposed on the housing, wherein the processing device is operably connected to the at least one memory device, the display device, and the electronic input device, and wherein the memory stores computer readable instructions for the processor that, when executed, cause the processor to: (a) provide a virtual deck of cards, wherein the virtual cards in the deck have been selected from a virtual pool of cards, the cards in the pool being divided into player position categories and the deck comprising multiple virtual cards from each of the player position categories, wherein the virtual cards comprise identifying information and real-life statistics related to player's action in real-life sporting events, and wherein the cards in the deck have been selected from the pool of cards such that the probability of the cards in the deck generating a winning total based on a predetermined pay table is maintained within a pre-determined range; (b) randomly select, via the electronic processing device, a hand of a designated quantity of cards from a virtual deck of cards; (c) display, via the display device, the randomly selected cards face-up; (d) enable a user to select, via the input devices, which, if any, of the displayed cards to keep for the current hand; (e) discard, via the electronic processing device, any displayed cards not kept for the current hand; (0 complete the hand by, for each of any discarded cards of the hand, randomly selecting, via the electronic processing device, one of the cards remaining in the virtual deck of cards, and displaying, via the display device, that randomly selected card in place of any of the discarded cards; (g) randomly select a statistic from among the real-life statistics related to player's actions in real-life sporting events for each card in the user's hand and display the selected statistic on the card as a score; (h) evaluate, via the electronic processing device, the completed hand and scores for a winning total; and (i) display, via the display device, any awards or payout values associated with any winning total formed by the completed hand.

103. The machine of embodiment 102, wherein the winning total is based on the sum of the scores on the cards in a user's hand.

104. The machine of embodiment 102, wherein the winning total is correlated to a predetermined payout value on a pay table.

105. The machine of embodiment 102, wherein the winning total is based in part on pre-determined values assigned to individual cards or card combinations.

106. The machine of embodiment 102, wherein one of the real-life statistics for each virtual card is designated as special and wherein the winning total is based in part of the number of special scores in a user's hand.

107. The machine of embodiment 102, wherein the winning total is based in part of the combination of player position categories on the cards in a user's hand.

108. The machine of embodiment 102, further comprising a wager-input device.

109. A method of conducting a wagering game on a video gaming system comprising a processor, a video display, and a player input controls, the method comprising: (a) the processor providing a virtual deck of cards, wherein the virtual cards in the deck have been selected from a virtual pool of cards, the cards in the pool being divided into player categories and the deck comprising multiple virtual cards from each of the player categories, wherein the virtual cards comprise identifying information and real-life statistics related to player's action in real-life sporting events; (b) the processor recognizing at least one first wager from a player input control associated with a user; (c) the processor dealing a quantity of virtual cards from the virtual deck to generate a hand; (d) displaying, via the display device, the cards in the hand face up to the user; (e) the processor enabling the user to select, via an input device, which, if any, of the displayed cards to keep for the current hand; (0 the processor discarding any displayed cards not selected by the user to be kept for the current hand; (g) the processor completing the hand by, for each of any discarded cards of the hand, randomly selecting one of the cards remaining in the virtual deck of cards, and displaying, via the display device, that randomly selected card in place of any of the discarded cards; (h) the processor enabling the user, via an input device, to place a bet or to fold and exit the hand; (i) the processor randomly selecting a statistic from among the real-life statistics related to player's actions in real-life sporting events for each card in the user's hand and displaying the selected statistic on the card as a score; (j) the processor evaluating the completed hand for any of a plurality of winning score totals or card combinations on a pay table; and (k) the processor displaying, via the display device, any awards associated with any winning score totals or card combinations formed by the completed hand.

Additional Embodiments to be Implemented in a Similar Manner as Embodiments Described Above In sum, a basic game may deal five or more cards wherein each card may represent a different position for a fantasy sports team. The cards typically include players from a real-life sports league. A user may hold or return which ever cards they want and can get replacement cards for the ones they return similar to a poker game. A user may then receive a score based on randomly-selected scores for each card. These randomly selected scores come from a set of real fantasy scores for each player. In a Keepers game, the user may hold a card or cards from one hand to the next, instead of returning that card to the deck. Keeper Tokens may be bought or earned to put on the cards a user wants to hold. In Trading Up, after the cards have been dealt a user may tap a card and get a card ranked one or more higher than the one they were dealt. A user may do this multiple times. Re-Spins may allow a user to get a new score if they don't like the one they got. These re-spins may be bought or earned. Top 10, Top 5, etc. allow a user to guarantee a good score on a card. This may be done before scoring happens or in some embodiments as part of a re-spin. These too may be bought or earned. As described above, in some embodiments Sleepers may be employed as part of a game and/or for a bonus game. These and other embodiments are described in further detail below.

Keepers

In some embodiments, after a hand is finished and before the next hand is dealt, the user could touch, click with a mouse, signal by hand gesture, or in some other way indicate they would like select one or more cards from his or her current hand to keep for the next hand. The rest of the cards from the hand could be discarded. The deal for the next hand would then fill in the hand with new cards that, along with the "kept" cards, would make up a complete hand. In some embodiments the user would pay for or otherwise earn this ability to keep cards from one hand to the next.

Trading Up

In some embodiments the user could touch, click with a mouse, signal by hand gesture, or in some other way indicate they would like to change a card they have been dealt. By so indicating, the card would be removed from the user's hand and one of a higher rank would replace it. In some embodiments the user would pay for or otherwise earn this ability to trade for one or more new cards guaranteed to be better than the card he or she has.

Re-Spins

In some embodiments a user could request a "re-spin" after the initial scoring has been randomly created and displayed. The user could touch, click with a mouse, signal by hand gesture, or in some other way indicate they would like to have anew randomly-selected score for one or more of his or her cards. In some embodiments the user would pay for otherwise earn this ability to request a new score for a card or cards.

Top Ten, Top Five, Top Three, Etc.

In some embodiments a user could request that the score a card or cards in his or her hand is guaranteed to be among the best 10 or best 5 or best 3 or some other amount, including the very best score available, among the player card's scores. The user could touch, click with a mouse, signal by hand gesture, or in some other way indicate they would like to have a guaranteed best randomly-selected score for one or more of his or her cards. In some embodiments the user would pay for or otherwise earn this ability to request a guaranteed top 10, top 5, top 3 or some other score for a card or cards.

In some embodiments this "guaranteed scoring" could come before the initial scoring is displayed. In some embodiments this "guaranteed scoring" could be in conjunction with a "re-spin".

"Sleeper" Combinations

In some embodiments the user could earn a win for a combination of the type of card held and for the amount of points earned in the hand. For example, a user might earn a higher payout or a bonus payout for holding a lesser-ranked card or cards while still reaching the point thresholds set for earning a payout. Where the typical strategy would be to use the highest-ranked cards possible, using lesser-ranked cards increase risk and could increase payout. In some embodiments the user could make a bonus or side-bet to earn a higher payout in such combinations. In some embodiments playing these combinations would be a regular part of game play.

Bonus Games

In some embodiments, after a user has won a hand, the user is offered the opportunity to play a bonus game. In some embodiments the user does not have to win a hand to have access to bonus games.

In some embodiments the user is allowed to wager on the bonus game.

In some embodiments a bonus game involves dealing one or more player cards to the user. If the game involves a single card, the user must select if the score for the player card will be over or under a set amount of points. In some embodiments the set amount is the median of the player's score set. In some embodiments the set amount is the average of the player's score set. In some embodiments the set amount of points is chosen randomly.

In some embodiments where there are multiple cards in a bonus game, the user first selects which card to play and then the user must select if the score for the player card will be over or under a set amount.

In some embodiments where there are multiple cards in a bonus game, the user must select if the score for the player card will be over or under a set amount on multiple cards.

In some embodiments the user must select which score will be higher between two or more cards.

In some embodiments, where the user must select which score will be higher between two or more cards, odds will be provided for each card to represent for the likelihood of that card being the higher or highest score among the cards In some embodiments a point spread, a number of points that represents the point difference between two cards with different average score sets, is provided to the user.

In some embodiments the user will be shown a card with a score on it. The user then must select among some other amount of cards which do not currently show a score, which card or cards will have a higher score than the one being displayed.

In some embodiments the user will be shown a card with a score on it. The user then must select among some other amount of cards which do not currently show a score, which card or cards will have a lower score than the one being displayed.

Match Bonus Games

In some embodiments, if a user has a match of two or more ranked cards at the end of a hand, the user is offered the opportunity to play a bonus game.

In some embodiments the match could be based on some criteria other than rank, such as team or season or player position.

In some embodiments, when a user has matching cards at the end of a hand, the user is given a chance to wager if on the next deal during regular gameplay they will receive more matching cards in their hand.

In some embodiments, when a user has matching cards at the end of a hand, the user is given a chance to wager if they will receive more matching cards in their hand as part of a separate deal of the cards, which is not part of the regular gameplay.

Further Specific Embodiments

1. An electronic gaming table configured to accommodate a plurality of users, the table comprising:

at least one electronic processor;

at least one electronic memory;

at least one electronic player input device; and at least one electronic display, wherein the electronic display serves as a gaming surface and a table surface, and wherein the electronic memory, the input device, and the display are operatively connected to the processor, and wherein the memory stores computer readable instructions for the processor that, when executed, cause the processor to:

(a) provide a virtual deck of cards, wherein the virtual cards in the deck have been selected from a virtual pool of cards, the cards in the pool being divided into at least five different player position categories and the deck comprising 12 or more virtual cards from each of the at least five player position categories, wherein the virtual cards comprise identifying information and real-life statistics related to player's actions in real-life sporting events, and wherein the cards in the deck have been selected from the pool of cards such that the probability of the cards in the deck generating a winning total based on the real-life statistics of the selected cards in the deck is maintained within a pre-determined range;

(b) randomly select a hand of a designated quantity of cards from the virtual deck of cards;

(c) display, via the display device, at least a portion of the randomly selected cards face-up;

(d) enable the users, via an input device, to place a bet or to fold and exit the hand;

(e) enable each user to select, via an input device, which, if any, of the displayed cards for the current hand (1) to keep or (2) to discard or (3) both;

(f) discard and keep cards as selected by the user for the current hand;

(g) complete the hand by, for each of any discarded cards of the hand, randomly selecting one of the cards remaining in the virtual deck of cards, and displaying, via the display device, that randomly selected card in place of any of the discarded cards;

(h) enable the users, via an input device, to place a bet or to fold and exit the hand;

(i) randomly select a statistic from among the real-life statistics related to player's actions in real-life sporting events for each card in the user's hand and display the selected statistic on the card as a score;

(j) evaluate the completed hand of each user and determine a winning user based on a winning total; and (k) display, via the display device, any awards or payout values associated with any winning card combinations or a winning total formed by the completed hands.

2. The gaming table of embodiment 1, wherein the virtual cards identify players in the National Football League.

3. The gaming table of embodiment 2, wherein the real-life statistics on the virtual cards are from a single playing season.

4. The gaming table of embodiment 2, wherein the real-life statistics on the virtual cards are from multiple playing seasons.

5. The gaming table of embodiment 1, wherein the winning total is based on the sum of the scores on the cards in a user's hand and pre-determined values assigned to individual cards or card combinations.

6. The gaming table of embodiment 1, wherein one of the real-life statistics for each virtual card is designated as special and wherein the winning total is based in part of the number of special scores in a user's hand.

7. The gaming table of embodiment 1, wherein the winning total is based in part of the combination of player position categories on the cards in a user's hand.

8. A gaming machine for playing a card-based wagering game, the machine comprising:

a housing;

an electronic display device disposed on the housing;

an electronic input device disposed on the housing, wherein the electronic input device is configured to receive a physical or wireless input, at least one memory device disposed on the housing;

at least one electronic processing device disposed on the housing, wherein the processing device is operably connected to the at least one memory device, the display device, and the electronic input device, and wherein the memory stores computer readable instructions for the processor that, when executed, cause the processor to:

(a) provide a virtual deck of cards, wherein the virtual cards in the deck have been selected from a virtual pool of cards, the cards in the pool being divided into player position categories and the deck comprising multiple virtual cards from each of the player position categories, wherein the virtual cards comprise identifying information and real-life statistics related to player's action in real-life sporting events, and wherein the cards in the deck have been selected from the pool of cards such that the probability of the cards in the deck generating a winning total based on a predetermined pay table is maintained within a pre-determined range;

(b) randomly select, via the electronic processing device, a hand of a designated quantity of cards from a virtual deck of cards;

(c) display, via the display device, at least a portion of the randomly selected cards face-up;

(d) enable a user to select, via the input devices, which, if any, of the displayed cards for the current hand (1) to keep or (2) to discard or (3) both;

(e) discard, via the electronic processing device, any displayed cards not kept for the current hand;

(f) complete the hand by, for each of any discarded cards of the hand, randomly selecting, via the electronic processing device, one of the cards remaining in the virtual deck of cards, and displaying, via the display device, that randomly selected card in place of any of the discarded cards;

(g) randomly select a statistic from among the real-life statistics related to player's actions in real-life sporting events for each card in the user's hand and display the selected statistic on the card as a score;

(h) evaluate, via the electronic processing device, the completed hand and scores for a winning total; and (i) display, via the display device, any awards or payout values associated with any winning total formed by the completed hand.

9. The machine of embodiment 8, wherein the winning total is based on the sum of the scores on the cards in a user's hand.

10. The machine of embodiment 8, wherein the winning total is correlated to a predetermined payout value on a pay table.

11. The machine of embodiment 8, wherein the winning total is based in part on pre-determined values assigned to individual cards or card combinations.

12. The machine of embodiment 8, wherein one of the real-life statistics for each virtual card is designated as special and wherein the winning total is based in part of the number of special scores in a user's hand.

13. The machine of embodiment 8, wherein the winning total is based in part of the combination of player position categories on the cards in a user's hand.

14. The machine of embodiment 8, further comprising a wager-input device.

15. A method of conducting a wagering game on a video gaming system comprising a processor, a video display, and a player input controls, the method comprising:

(a) the processor providing a virtual deck of cards, wherein the virtual cards in the deck have been selected from a virtual pool of cards, the cards in the pool being divided into player categories and the deck comprising multiple virtual cards from each of the player categories, wherein the virtual cards comprise identifying information and real-life statistics related to player's action in real-life sporting events;

(b) the processor recognizing at least one first wager from a player input control associated with a user;

(c) the processor dealing a quantity of virtual cards from the virtual deck to generate a hand;

(d) displaying, via the display device, at least a portion of the cards in the hand face up to the user;

(e) the processor enabling the user to select, via an input device, which, if any, of the displayed cards for the current hand (1) to discard or (2) to keep or (3) both;

(f) the processor discarding and keeping displayed cards as selected by the user for the current hand;

(g) the processor completing the hand by, for each of any discarded cards of the hand, randomly selecting one of the cards remaining in the virtual deck of cards, and displaying, via the display device, that randomly selected card in place of any of the discarded cards;

(h) the processor enabling the user, via an input device, to place a bet or to fold and exit the hand;

(i) the processor randomly selecting a statistic from among the real-life statistics related to player's actions in real-life sporting events for at least a portion of the cards in the user's hand and displaying the selected statistic on the at least a portion of the cards in the user's hand as a score;

(j) the processor evaluating the completed hand for any of a plurality of winning score totals or card combinations on a pay table; and (k) the processor displaying, via the display device, any awards associated with any winning score totals or card combinations formed by the completed hand.

16. The method of embodiment 15 which further comprises:

the processor enabling the user to select, via an input device, which, if any, of the cards in the completed hand to be kept for the next hand.

17. The method of embodiment 15 which further comprises:

the processor enabling the user to select, via an input device, which, if any, of the displayed cards for the current hand to replace with a card guaranteed to be of a higher rank.

18. The method of embodiment 15 which further comprises:

the processor enabling the user to select, via an input device, a new randomly-selected score for one or more of the displayed cards.

19. The method of embodiment 15 which further comprises:

the processor enabling the user to select, via an input device, a new randomly-selected score for one or more of the displayed cards wherein the new, randomly-selected score is guaranteed to be of at least a certain predefined minimum score.

20. The method of embodiment 15 which further comprises:

the processor evaluating whether to award a bonus for a completed hand for the user holding one or more lesser-ranked cards and reaching a pre-defined minimum point threshold.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

I claim:

1. An electronic gaming table configured to accommodate a plurality of users, the table comprising:

at least one electronic processor;

at least one electronic memory;

at least one electronic player input device; and at least one electronic display, wherein the electronic display serves as a gaming surface and a table surface, and wherein the electronic memory, the input device, and the display are operatively connected to the processor, and wherein the memory stores computer readable instructions for the processor that, when executed, cause the processor to:

(a) provide a virtual deck of cards, wherein the virtual cards in the deck have been selected from a virtual pool of cards, the cards in the pool being divided into at least five different player position categories and the deck comprising 12 or more virtual cards from each of the at least five player position categories, wherein the virtual cards comprise identifying information and real-life statistics related to player's actions in real-life sporting events, and wherein the cards in the deck have been selected from the pool of cards such that the probability of the cards in the deck generating a winning total based on the real-life statistics of the selected cards in the deck is maintained within a pre-determined range which is not tied to the probabilities inherent in a standard 52-card poker deck;

(b) randomly select a hand of a designated quantity of cards from the virtual deck of cards;

(c) display, via the display device, at least a portion of the randomly selected cards face-up;

(d) enable the users, via an input device, to place a bet or to fold and exit the hand;

(e) enable each user to select, via an input device, which, if any, of the displayed cards for the current hand (1) to keep or (2) to discard or (3) both;

(f) discard and keep cards as selected by the user for the current hand;

(g) complete the hand by, for each of any discarded cards of the hand, randomly selecting one of the cards remaining in the virtual deck of cards, and displaying, via the display device, that randomly selected card in place of any of the discarded cards;

(h) enable the users, via an input device, to place a bet or to fold and exit the hand;

(i) randomly select a statistic from among the real-life statistics related to player's actions in real-life sporting events for each card in the user's hand and display the selected statistic on the card as a score;

(j) evaluate the completed hand of each user and determine a winning user based on a winning total; and (k) display, via the display device, any awards or payout values associated with any winning card combinations or a winning total formed by the completed hands;

wherein the winning total is based on the combination of (1) the sum of the scores on the cards in the user's completed hand and (2) a number of different player position categories in the user's completed hand, a number of player season high scores in the user's completed hand, a number of matching player ranks in the user's completed hand, or a number of matching seasons in the user's completed hand.

2. The gaming table of claim 1, wherein the virtual cards identify players in the National Football League.

3. The gaming table of claim 2, wherein the real-life statistics on the virtual cards are from a single playing season.

4. The gaming table of claim 2, wherein the real-life statistics on the virtual cards are from multiple playing seasons.

5. The gaming table of claim 1, wherein the winning total is further based on pre-determined values assigned to individual cards or card combinations.

6. The gaming table of claim 1, wherein one of the real-life statistics for each virtual card is designated as special and wherein the winning total is further based in part of the number of special scores in a user's hand.

7. A gaming machine for playing a card-based wagering game, the machine comprising:

a housing;

an electronic display device disposed on the housing;

an electronic input device disposed on the housing, wherein the electronic input device is configured to receive a physical or wireless input, at least one memory device disposed on the housing;

at least one electronic processing device disposed on the housing, wherein the processing device is operably connected to the at least one memory device, the display device, and the electronic input device, and wherein the memory stores computer readable instructions for the processor that, when executed, cause the processor to:

(a) provide a virtual deck of cards, wherein the virtual cards in the deck have been selected from a virtual pool of cards, the cards in the pool being divided into player position categories and the deck comprising multiple virtual cards from each of the player position categories, wherein the virtual cards comprise identifying information and real-life statistics related to player's action in real-life sporting events, and wherein the cards in the deck have been selected from the pool of cards such that the probability of the cards in the deck generating a winning total based on a predetermined pay table is maintained within a pre-determined range which is not tied to the probabilities inherent in a standard 52-card poker deck;

(b) randomly select, via the electronic processing device, a hand of a designated quantity of cards from a virtual deck of cards;

(c) display, via the display device, at least a portion of the randomly selected cards face-up;

(d) enable a user to select, via the input devices, which, if any, of the displayed cards for the current hand (1) to keep or (2) to discard or (3) both;

(e) discard, via the electronic processing device, any displayed cards not kept for the current hand;

(f) complete the hand by, for each of any discarded cards of the hand, randomly selecting, via the electronic processing device, one of the cards remaining in the virtual deck of cards, and displaying, via the display device, that randomly selected card in place of any of the discarded cards;

(g) randomly select a statistic from among the real-life statistics related to player's actions in real-life sporting events for each card in the user's hand and display the selected statistic on the card as a score;

(h) evaluate, via the electronic processing device, the completed hand and scores for a winning total; and (i) display, via the display device, any awards or payout values associated with any winning total formed by the completed hand;

wherein the winning total is based on the combination of (1) the sum of the scores on the cards in the user's completed hand and (2) a number of different player position categories in the user's completed hand, a number of player season high scores in the user's completed hand, a number of matching player ranks in the user's completed hand, or a number of matching seasons in the user's completed hand.

8. The machine of claim 7, wherein the winning total is correlated to a predetermined payout value on a pay table.

9. The machine of claim 7, wherein the winning total is further based in part on pre-determined values assigned to individual cards or card combinations.

10. The machine of claim 7, wherein one of the real-life statistics for each virtual card is designated as special and wherein the winning total is further based in part of the number of special scores in a user's hand.

11. The machine of claim 7, further comprising a wager-input device.

12. A method of conducting a wagering game on a video gaming system comprising a processor, a video display, and a player input controls, the method comprising:

(a) the processor providing a virtual deck of cards, wherein the virtual cards in the deck have been selected from a virtual pool of cards, the cards in the pool being divided into player categories and the deck comprising multiple virtual cards from each of the player categories, wherein the virtual cards comprise identifying information and real-life statistics related to player's action in real-life sporting events;

(b) the processor recognizing at least one first wager from a player input control associated with a user;

(c) the processor dealing a quantity of virtual cards from the virtual deck to generate a hand;

(d) displaying, via the display device, at least a portion of the cards in the hand face up to the user;

(e) the processor enabling the user to select, via an input device, which, if any, of the displayed cards for the current hand (1) to discard or (2) to keep or (3) both;

(f) the processor discarding and keeping displayed cards as selected by the user for the current hand;

(g) the processor completing the hand by, for each of any discarded cards of the hand, randomly selecting one of the cards remaining in the virtual deck of cards, and displaying, via the display device, that randomly selected card in place of any of the discarded cards;

(h) the processor enabling the user, via an input device, to place a bet or to fold and exit the hand;

(i) the processor randomly selecting a statistic from among the real-life statistics related to player's actions in real-life sporting events for at least a portion of the cards in the user's hand and displaying the selected statistic on the at least a portion of the cards in the user's hand as a score;

(j) the processor evaluating the completed hand for any of a plurality of winning score totals or card combinations on a pay table; and (k) the processor displaying, via the display device, any awards associated with any winning score totals or card combinations formed by the completed hand;

wherein the winning score totals are based on the combination of (1) the sum of the scores on the cards in the user's completed hand and (2) a number of different player position categories in the user's completed hand, a number of player season high scores in the user's completed hand, a number of matching player ranks in the user's completed hand, or a number of matching seasons in the user's completed hand.

13. The method of claim 12 which further comprises: the processor enabling the user to select, via an input device, which, if any, of the cards in the completed hand to be kept for the next hand.

14. The method of claim 12 which further comprises: the processor enabling the user to select, via an input device, which, if any, of the displayed cards for the current hand to replace with a card guaranteed to be of a higher rank.

15. The method of claim 12 which further comprises: the processor enabling the user to select, via an input device, a new randomly-selected score for one or more of the displayed cards.

16. The method of claim 12 which further comprises: the processor enabling the user to select, via an input device, a new randomly-selected score for one or more of the displayed cards wherein the new, randomly-selected score is guaranteed to be of at least a certain predefined minimum score.

17. The method of claim 12 which further comprises: the processor evaluating whether to award a bonus for a completed hand for the user holding one or more lesser-ranked cards and reaching a pre-defined minimum point threshold.

18. The method of claim 12 which further comprises: the processor enabling the user to select, via an input device, an opportunity to play a bonus game.

* * * * *